(12) United States Patent
Iijima et al.

(10) Patent No.: US 6,621,524 B1
(45) Date of Patent: Sep. 16, 2003

(54) IMAGE PICKUP APPARATUS AND METHOD FOR PROCESSING IMAGES OBTAINED BY MEANS OF SAME

(75) Inventors: Jun Iijima, Fussa (JP); Kazuto Yamamoto, Akishima (JP); Takahiro Fuse, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/001,025

(22) Filed: Dec. 30, 1997

(30) Foreign Application Priority Data

Jan. 10, 1997 (JP) ............................. 9-014709
Oct. 31, 1997 (JP) ............................. 9-315906

(51) Int. Cl.⁷ ............................ H04N 9/74; G06K 9/20
(52) U.S. Cl. ....................................... 348/584; 382/282
(58) Field of Search .................. 382/282, 283, 382/284, 237; 348/584, 586, 190, 218, 239, 220.1

(56) References Cited

U.S. PATENT DOCUMENTS

| | | | | |
|---|---|---|---|---|
| 4,417,791 A | * | 11/1983 | Erland et al. ............... | 352/45 |
| 4,456,931 A | | 6/1984 | Toyoda et al. .............. | 358/335 |
| 4,954,912 A | * | 9/1990 | MacDonald et al. ......... | 358/448 |
| 4,968,132 A | * | 11/1990 | Ferren ....................... | 352/46 |
| 5,073,926 A | * | 12/1991 | Suzuki et al. .............. | 348/17 |
| 5,115,314 A | | 5/1992 | Ross et al. | |
| 5,270,810 A | * | 12/1993 | Nishimura ............... | 348/220.1 |
| 5,274,453 A | * | 12/1993 | Maeda ........................ | 348/584 |
| 5,353,063 A | * | 10/1994 | Yagisawa et al. ............ | 348/426 |
| 5,477,264 A | * | 12/1995 | Sarbadhikari et al. ....... | 348/231 |
| 5,633,678 A | * | 5/1997 | Parulski et al. .............. | 348/232 |
| 5,892,554 A | * | 4/1999 | DiCicco et al. .............. | 348/584 |
| 5,907,315 A | * | 5/1999 | Vlahos et al. ............... | 345/114 |
| 5,940,139 A | * | 8/1999 | Smoot ........................ | 348/584 |
| 5,982,350 A | * | 11/1999 | Hekmatpour et al. ........ | 345/113 |
| 6,222,637 B1 | * | 4/2001 | Ito et al. ..................... | 358/1.18 |

FOREIGN PATENT DOCUMENTS

| | | |
|---|---|---|
| EP | 0 560 624 A2 | 9/1993 |
| GB | 2 299 725 A | 10/1996 |
| JP | 4-248775 | 9/1992 |
| WO | WO 93/06691 | 4/1993 |

OTHER PUBLICATIONS

Patent Abstracts of Japan, vol. 016, No. 417, Sep. 3, 1992, of JP 04 142886 A, May 15, 1992.

* cited by examiner

Primary Examiner—Wendy R. Garber
Assistant Examiner—Rashawn N. Tillery

(57) ABSTRACT

An image pickup apparatus and a method for processing images are provided whereby it is possible to register a plurality of mask patterns, to select a desired one among the plurality of registered mask patterns, and to cut-out a desired part of a taken image by using the selected mask pattern to synthesize a new image, which is stored. In addition, it is also possible to extract a part of an image or the whole of an image of a stored taken image to be registered as a mask pattern.

26 Claims, 26 Drawing Sheets

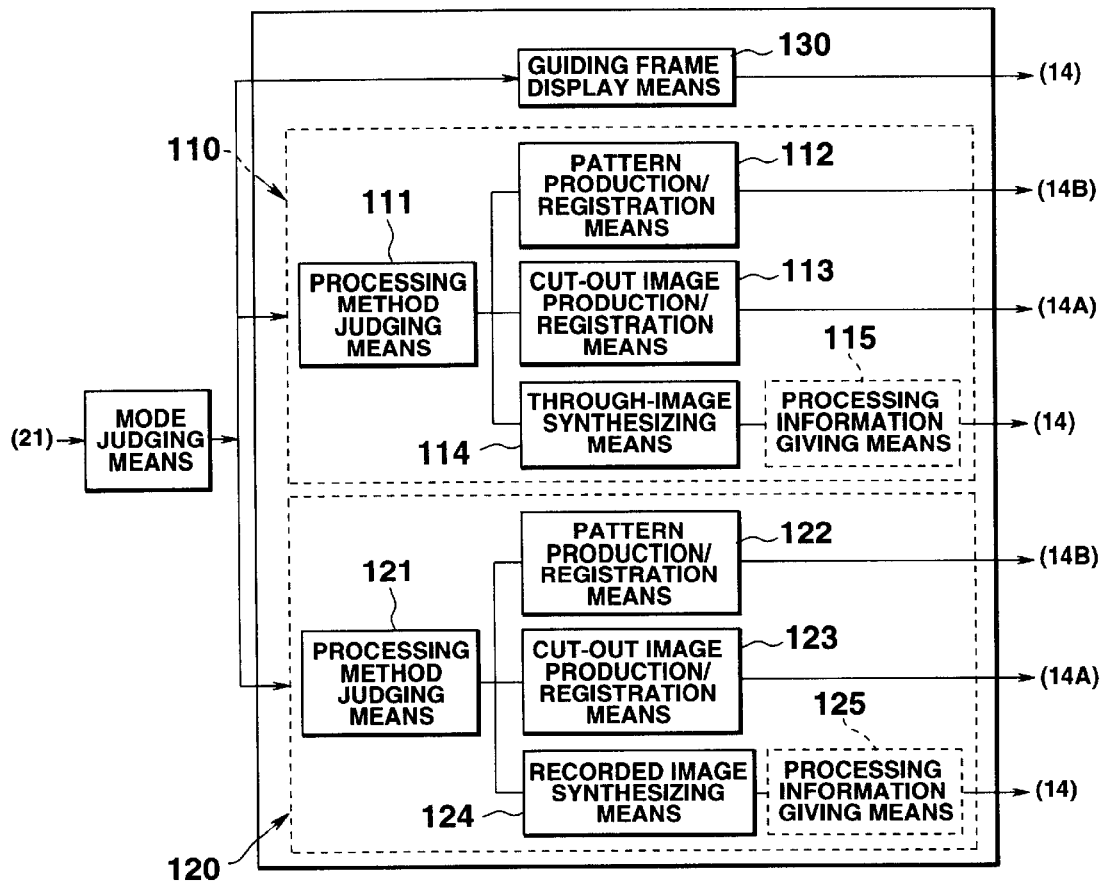
FIG.4A
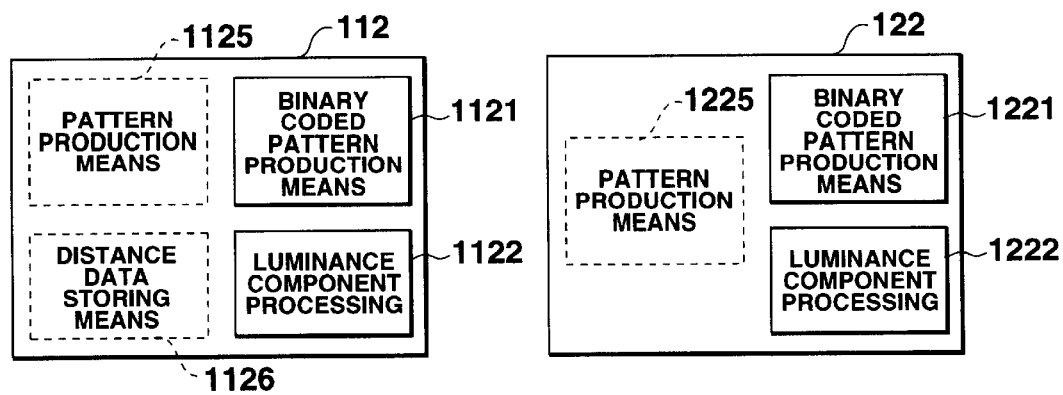
FIG.4B　　　FIG.4C

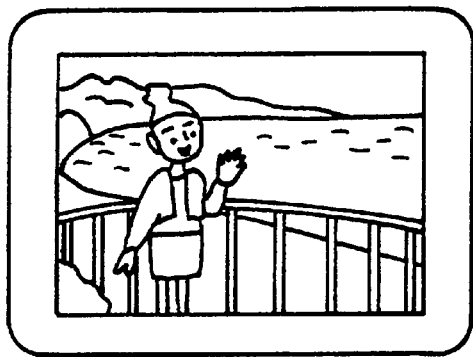
TAKEN IMAGE
FIG.6A
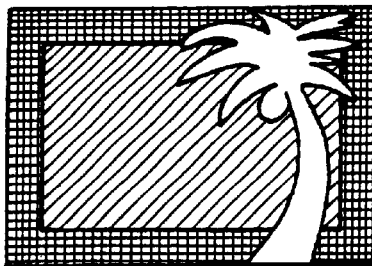
IMAGE WITH FRAME
FIG.6B
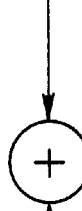
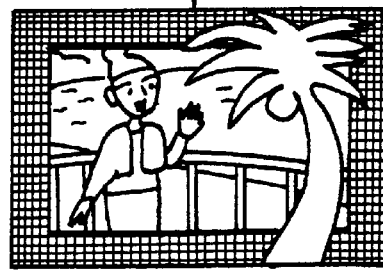
SYNTHESIZED IMAGE
FIG.6C

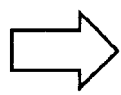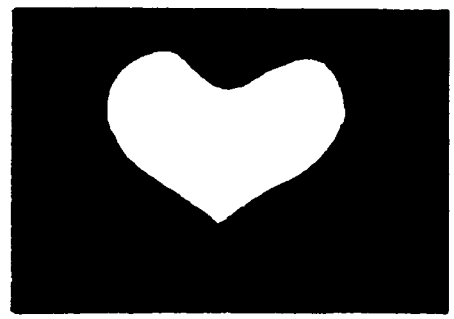
FIG.8A   FIG.8B
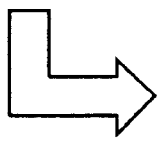
FIG.8C

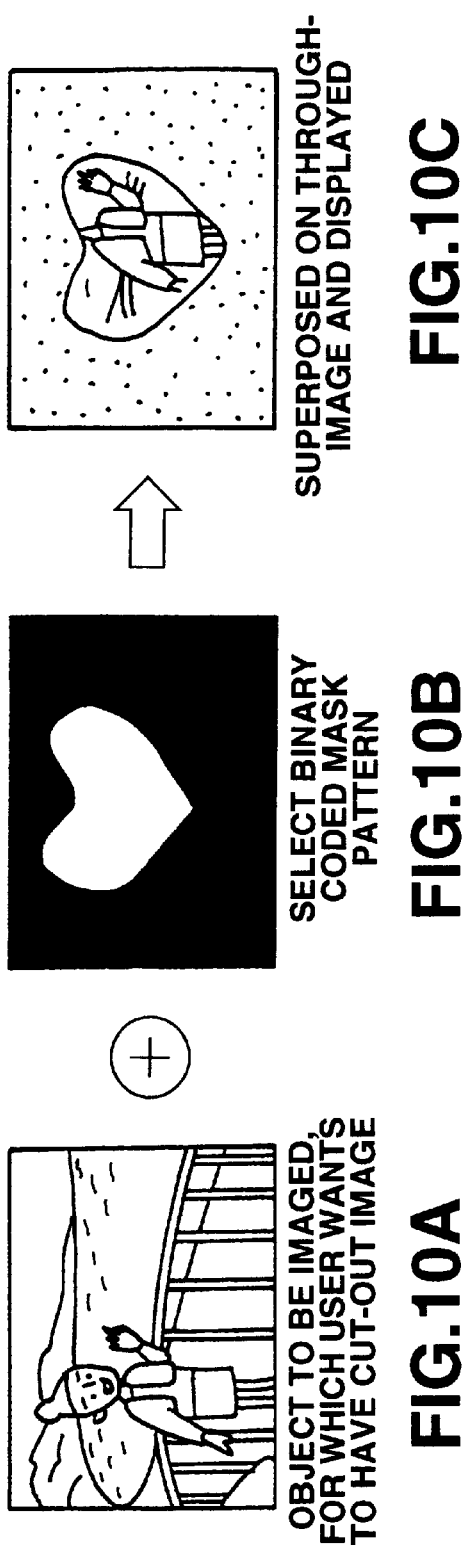

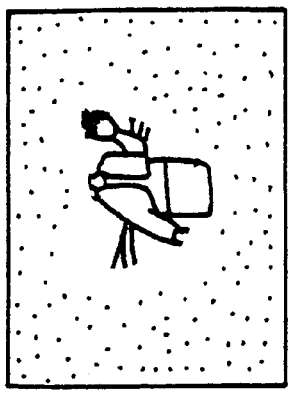
FIG.11A
OBJECT TO BE IMAGED, FOR WHICH USER WANTS TO HAVE CUT-OUT IMAGE
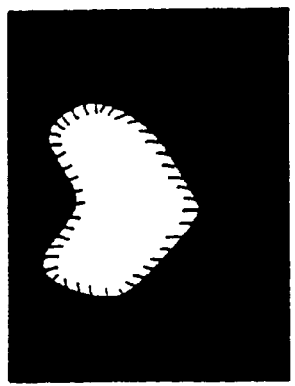
FIG.11B
SELECT MASK PATTERN
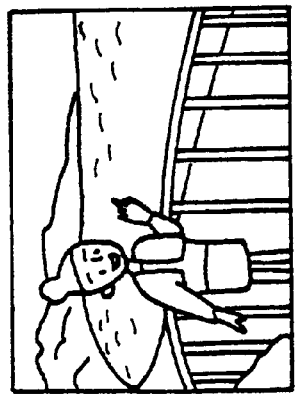
FIG.11C
SUPERPOSED ON THROUGH-IMAGE AND DISPLAYED
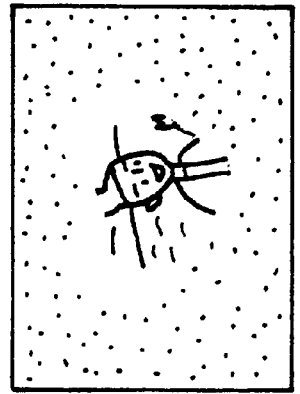
FIG.11D
PRODUCTION OF BLURRED CUT-OUT IMAGE

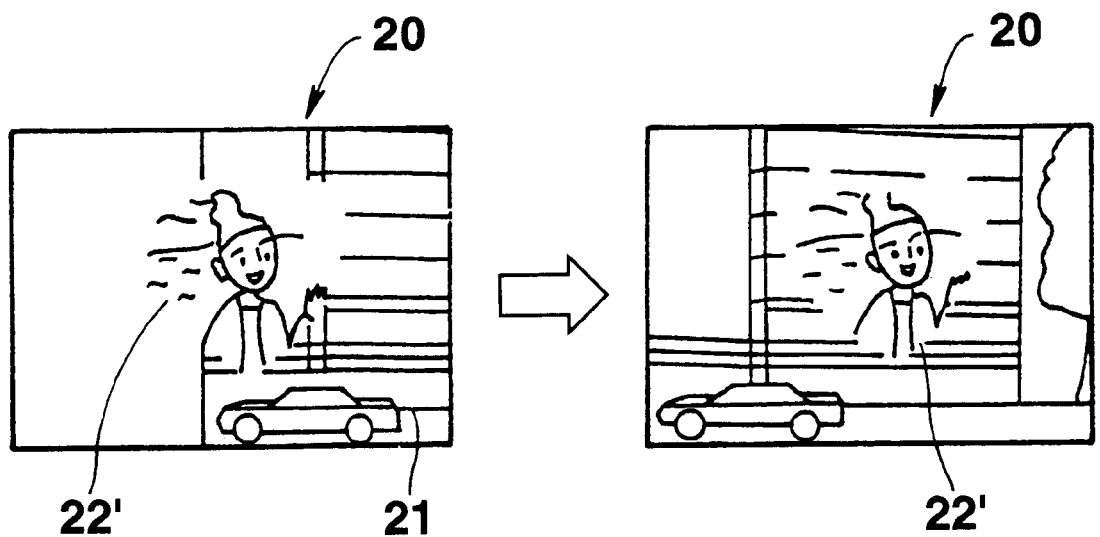
FIG.14A  FIG.14B

FIG.18A REPRODUCE IMAGE, WITH WHICH USER WANTS TO SYNTHESIZE NEW IMAGE, IS DISPLAYED

FIG.18B CUT-OUT IMAGE IS DISPLAYED

FIG.18C REPRODUCE IMAGE IS MOVED BY MEANS OF DISPLACEMENT KEYS SO THAT IT IS APPROPRIATELY POSITIONED WITHIN FRAME

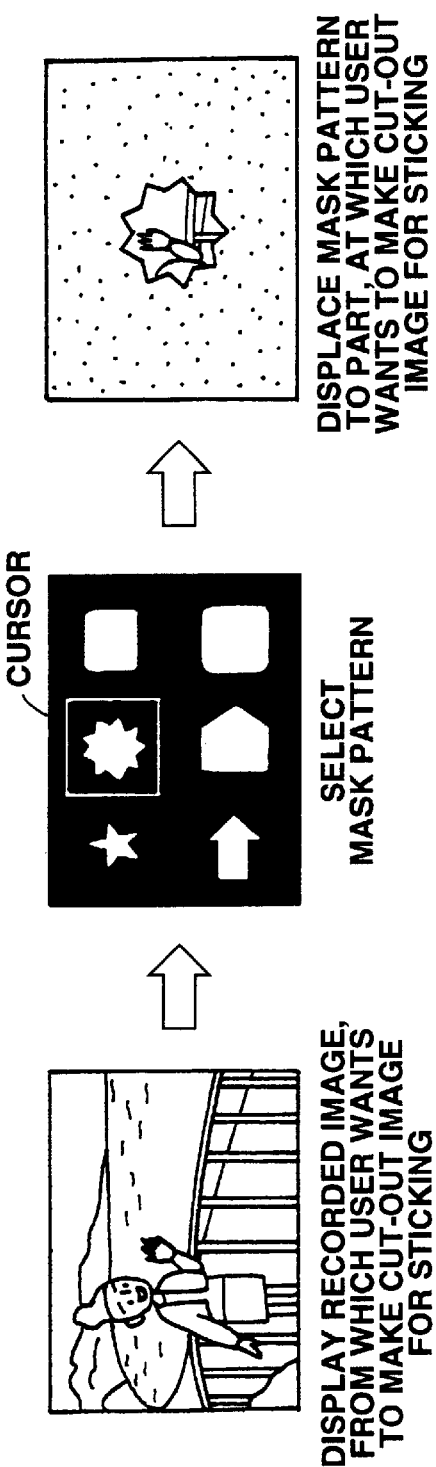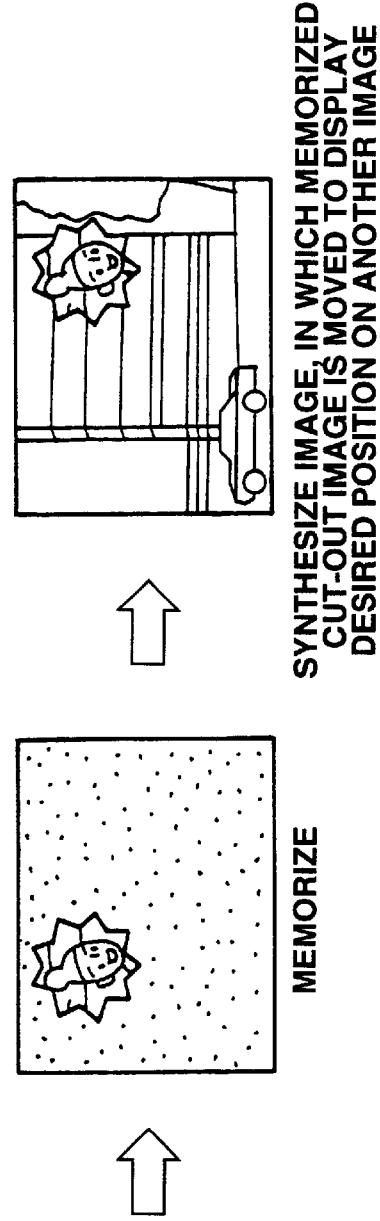

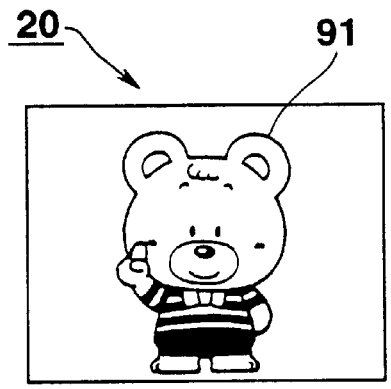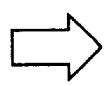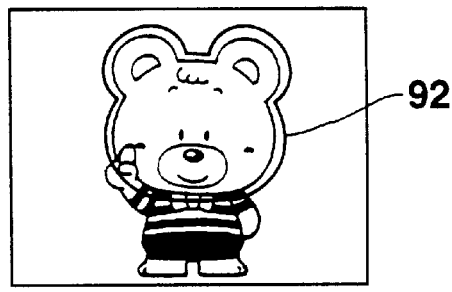
FIG.23A  FIG.23B
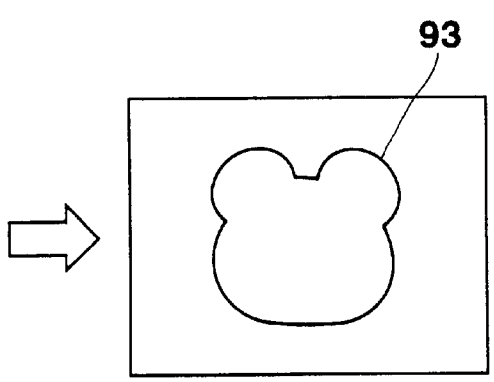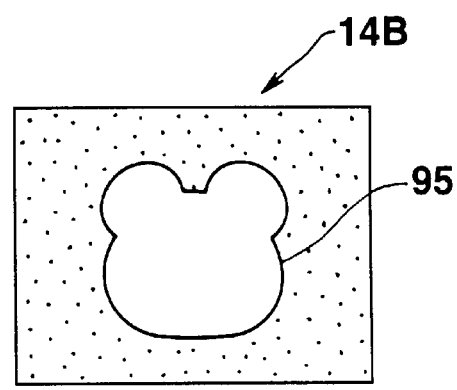
FIG.23C  FIG.23D

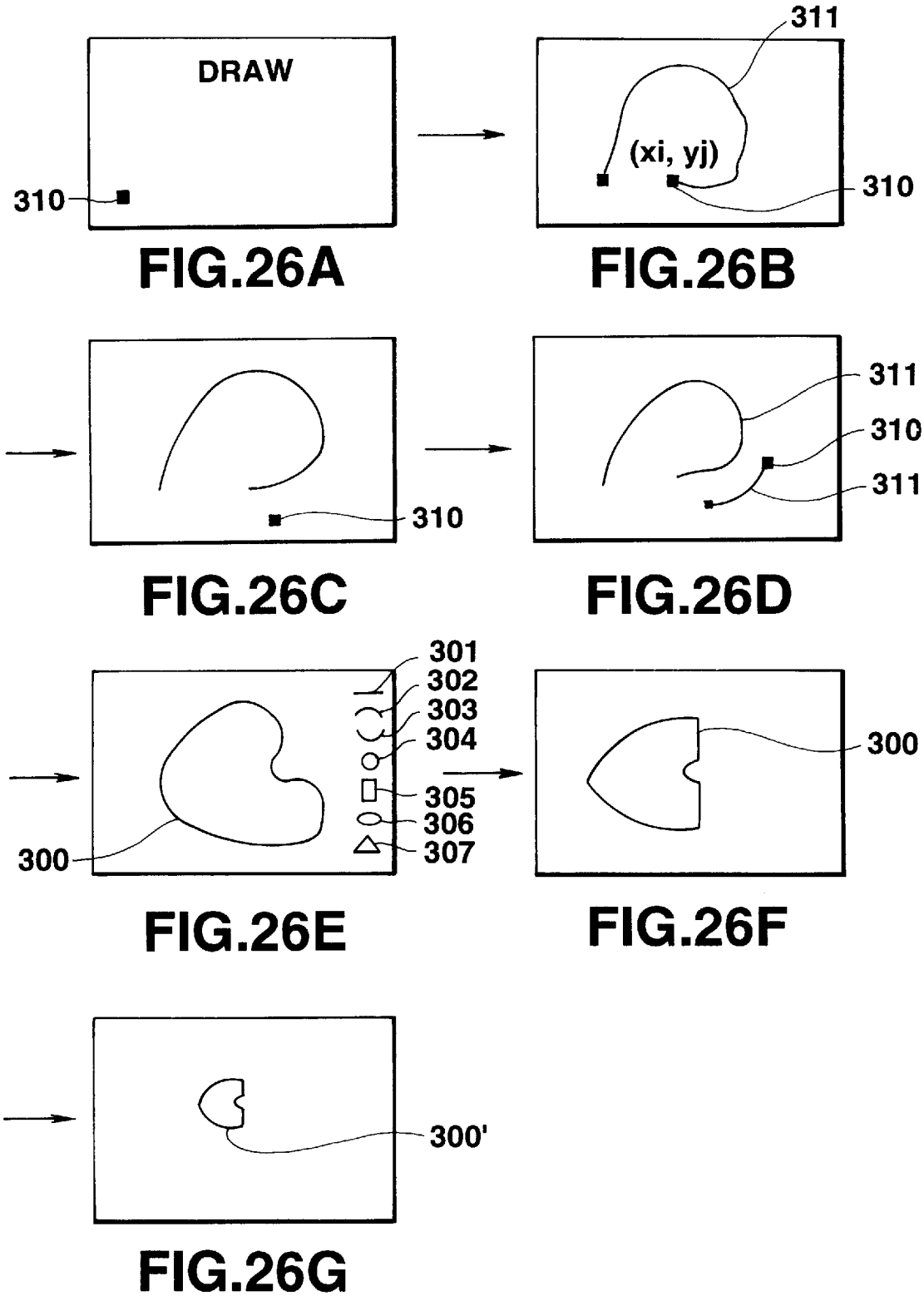

IMAGE PICKUP APPARATUS AND METHOD FOR PROCESSING IMAGES OBTAINED BY MEANS OF SAME

BACKGROUND OF THE INVENTION

1. Field of the Invention

This invention relates to an image pickup apparatus for imaging a subject and an image processing method, and in particular, it is suitable for a digital still camera but is not restricted within such device.

2. Prior Art

Recently a digital camera has been developed, in which an image of an object transformed into electric signals by means of imaging elements such as CCD, etc. is converted into digital data (hereinbelow called image data) to be stored in a recording medium, which image can be reproduced according to desire of a user. Such cameras are spreading in a market as image recording/reproducing apparatuses and image inputting apparatuses for personal computers, etc. Further most of them are provided with a display device for displaying an image of an object at imaging and at the same time for displaying a reproduced image at reproduction.

In order to process video image data stored in a digital camera, the video image data is transmitted to an information processing apparatus such as a personal computer, etc., stored therein and the stored video image data is processed with an application program for video image processing.

However, in a case that a video image data is processed with a conventional application program for video image processing, a processing operation but it is very complicated, and for example, it can not be done easily to clip a desired part of a video image and to compose another video image it.

An object of the invention is to an imaging apparatus and a video image processing method suitable for clipping a desired part of a video image, and for composing another video image the clipped video image.

SUMMARY OF THE INVENTION

In order to attain the object of the invention, an image pickup apparatus according to the invention which comprises an image pickup means for imaging a subject to output an image and image memory means for storing the image outputted from said image pickup means, and is characterized by employment of pattern memory means for storing at least one pattern, clipped image producing means for clipping a corresponding part of the image stored in said image memory means with the pattern stored in said pattern memory means, and image composing means for composing a desired image the clipped image produced by said clipped image producing means.

Further a image processing method according to the invention comprises a first step clipping a corresponding part of an image with a pattern and a second step composing a desired image the clipped image.

The above apparatus and method of the invention will be explained in detail in the following.

Definition of Terms used in the Present Specification

In the following explanation of the present invention following terms between parentheses have following means.

(mask pattern): a pattern used as a mask for processing of cutting-out (extracting) an object image;

(cut-out image): a part of an image cut-out (extracted) from an object image by a mask processing;

(through-image): a monitor moving image of an object displayed on a screen of a display device at imaging;

(stored image): includes an image stored by imaging, an image previously registered, a monochrome image; an image registered in a memory medium mountable on and dismountable from an imaging apparatus such as an IC card, an ROM, etc.;

(background image): a cut-out image displayed on a display device or a stored image reproduced and displayed on a display device.

Summary

An imaging apparatus according to the present invention is provided with a such auxiliary function of processing an image that a part of a taken image is combined with another image to synthesize a new image. The auxiliary function of processing an image includes functions as indicated below in (a) to (h).

(a) an image synthesizing function of cutting-out a part of a taken image by using a mask pattern with another image to synthesize a cut-out image;

(b) a pattern production/registration function of extracting a mask pattern from a through-image displayed on a display device at imaging to register (record) it on a recording medium as the mask pattern;

(c) a cut-out image producting/registering function of combining a mask pattern selected by a user among a plurality of registered mask patterns with another through-image to synthesize a new image at imaging and to display it on a display device and of registering (recording) the synthesized image selected by the user as a cut-out image on a recording medium;

(d) an image sticking synthesizing function of sticking a cut-out image selected by a user among registered cut-out images with another through-image to synthesize a new image at imaging and to display it on a display device and of recording the synthesized image selected by the user on a recording medium;

(e) a pattern production/registration function of extracting a mask pattern from a recorded image recorded on a recording medium at recording to register it on a recording medium as a mask pattern;

(f) a cut-out image producting/registering function of combining a mask pattern selected by a user among a plurality of registered mask patterns with another through-image to synthesize a new image at reproduction and to display it on a display device and of registering (recording) the synthesized image selected by the user on a recording medium;

(g) an image sticking synthesizing function of sticking a cut-out image selected by a user among registered cut-out images with a reproduced stored image to synthesize a new image at reproduction and to display it on a display device and of recording the synthesized image selected by the user on a recording medium; and (h) a guiding frame displaying function of displaying a guiding frame giving a criterion of magnitude of an image to be taken at imaging.

Further the pattern production/registration function can include further following functions:

(i) a function of detecting/extracting a contour of an image displayed on a display device at imaging or at reproduction to register it as a mask pattern on a recording medium;

(j) a registering function of taking-in distances to a plurality of objects in a through-image to record them together with the image at imaging and designating a distance on a reproduced stored image to extract a mask pattern from an image of objects, which are at a same distance, at reproduction to register it on a recording medium; and (k) a function of drawing/displaying an image by means of a pointing device such as a cursor or an inputting pen and extracting a mask pattern thereof to register it on a recording medium.

Moreover it can include further following functions:

(l) a preview display function of displaying at a high speed for displaying mask patterns, cut-out images and background images on a display device at selection; and (m) a function of automatically determining resolution for automatically determining resolution so that recording speed is highest at recording a synthesized image.

BRIEF DESCRIPTION OF THE DRAWINGS

FIGS. 4A to 4C are block diagrams showing an example of construction of image processing means;

FIGS. 6A to 6C are diagrams for explaining an example of synthesis by combining an taken image with a cut-out image;

FIGS. 8A to 8C are diagrams for explaining a pattern production/registration process, based on the flow chart indicated in FIG. 7;

FIGS. 10A to 10D are diagrams for explaining a cut-out image production/registration process, based on the flow chart indicated in FIG. 9;

FIGS. 11A to 11D are diagrams for explaining another cut-out image production/registration process, based on the flow chart indicated in FIG. 9;

FIGS. 14A and 14B are diagrams for explaining a cutting-out image synthesizing process, based on the flow chart indicated in FIGS. 12A and 12B;

FIGS. 20A to 20E are diagrams for explaining a cut-out image production/registration process, based on the flow chart indicated in FIG. 19;

FIGS. 23A to 23D are diagrams for explaining an example of the mask pattern production by contour extraction;

FIGS. 26A to 26G are diagrams for explaining formation of a mask pattern from a drawn pattern based on the flow chart shown in FIG. 25.

DESCRIPTION OF THE PREFERRED EMBODIMENTS

EXAMPLES OF THE CIRCUIT CONSTRUCTION

Figure 1:
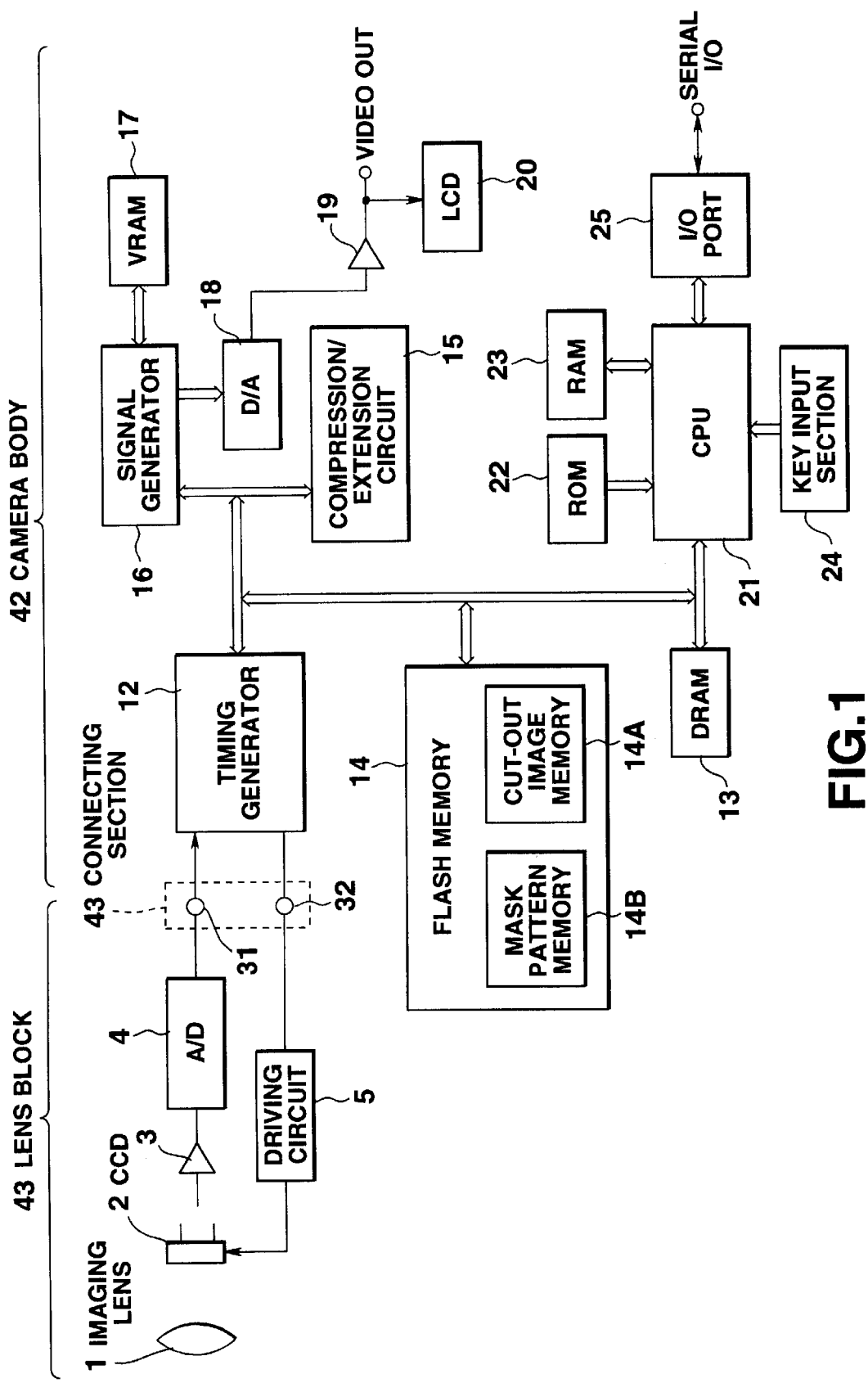
FIG. 1 is a block diagram showing an example of construction of a digital camera, which is an embodiment of the imaging apparatus according to the present invention.

FIG. 1 is a block diagram showing an example of construction of a digital camera, which is an embodiment of the imaging apparatus according to the present invention, in which the digital camera 100 is so constructed that a lens block 41 is connected with a camera body 42 through a connecting section 43.

The lens block 41 includes an imaging lens 1, a CCD (Charge Coupled Device) 2, an amplifier 3, an A/D converting circuit 4 and a driving circuit 5 and it is so constructed that the imaging lens 1 focuses an optical image taken-in from an object to be imaged on the CCD 2.

It is further so constructed that the CCD (imaging means) 2 converts light injected through the imaging lens (imaging means) 1 by the photoelectric effect and outputs a signal to the A/D converting circuit 4 through the amplifier 3 and the signal is outputted to the camera body 42 through a terminal 31 in the connecting section 43 after having been A/D converted.

The driving circuit 5 drives the CCD 2, when a control signal is inputted from the camera body 42 through a terminal 32 in the connecting section 43.

The camera body 42 includes a timing generator 12, a DRAM (Dynamic Random Access Memory) 13, a flash memory 14, a data compression/extension circuit 15, a signal generator 16, a VRAM (Video Random Access Memory) 17, a D/A converting circuit 18, an amplifier 19, a liquid crystal display (LCD), a CPU (Central Processing Unit) 21, a key input section 24 and an I/O port 25 and it is so constructed that image data (digital data) coming from the A/D converting circuit 4 through the terminal 31 in the connecting section 43 are supplied to the timing generator.

The timing generator 12 controls the driving circuit 5 through the terminal 32 to drive the CCD 2. The timing generator 12 writes also the image data supplied from the A/D converting circuit 4 in the DRAM 13. The image data written in the DRAM 13 has color components of yellow (Ye), cyan (Cy) and green (Gr).

In the DRAM 13, apart from a region, where the image data are stored temporarily, there is secured a work area for image processing (working region) at executing image processing treatment according to the present invention.

The image data written in the DRAM 13 are read-out with a predetermined period, when image data of one frame are accumulated, to be supplied to the signal generator 16.

Further the image data written in the DRAM 13 are compressed in the compression/extension circuit 15 and written in the flash memory 14 (taken image memorizing means) to be stored (record) there.

In the flash memory 14, apart from a region, where image data of a taken image are stored, there are disposed a cut-out image memory region 14A (cut-out image memorizing means), where a cut-out image is stored, and a mask pattern memory region 14B (mask pattern memorizing means). Further the clipped image memory region 14A and the mask pattern memory region 14B may be disposed in another memory medium, e.g. an ROM or a memory card.

The signal generator 16 takes-out the image data of one frame from the DRAM 13 with a predetermined period, which are subjected successively to while balance regulation and color processing treatment to produce YUV data (luminance signal Y as well as chrominance signals R-Y and B-Y), which are stored in the VRAM 17.

Further the signal generator 16 reads-out the YUV data stored in the VRAM 17 to output them to the D/A converting circuit 18. Then it outputs them to the liquid crystal display device 20 through the amplifier 19 to display the image after having D/A-converted them. Video signals outputted by the amplifier 19 can be outputted also to an external device not indicated in the figure.

Owing to the construction described above, the liquid crystal display (LCD) 20 can display the image of the object through the CCD 2 at imaging (through-image display) and display also a reproduced recorded image at image reproduction. Since images of the object displayed at imaging are displayed as a moving image through the imaging lens 1, (that is, monitor images (hereinbelow called through-images) depending on movement of the object or the digital camera are displayed), the liquid crystal display 20 can be used as a finder.

Further, in FIG. 1, a transparent position detecting sensor (not indicated in the figure) may be disposed on the screen of the liquid crystal display section 20. As the position detecting sensor e.g. light detecting elements or touch electrodes detecting specified light can be used. In case where light detecting elements are used as the position detecting sensor, a light detecting element which is at a pointed position is turned to an active state by the fact that a user points the position on the screen by means of an input pen emitting the specified light (e.g. infrared) as inputting means. The CPU 21 detects coordinates of light detecting elements turned to the active state and the user can know the position and the extent (form) of a pointed image. In case where tough electrodes are used, electrodes at a touched part are turned-on, when the user touches the part on the screen with a touch pen or the extremity of a finger. The CPU 21 detects coordinates of touch electrodes which are turned-on and the user can know the position and the extent (form) of a pointed image.

The CPU 21 executes various sorts of processing according to programs stored in the ROM 22 or the flash memory 14.

The RAM 23 memorizes appropriately programs and data, etc. necessary for execution of the various sorts of processing by the CPU 21.

Figure 2:
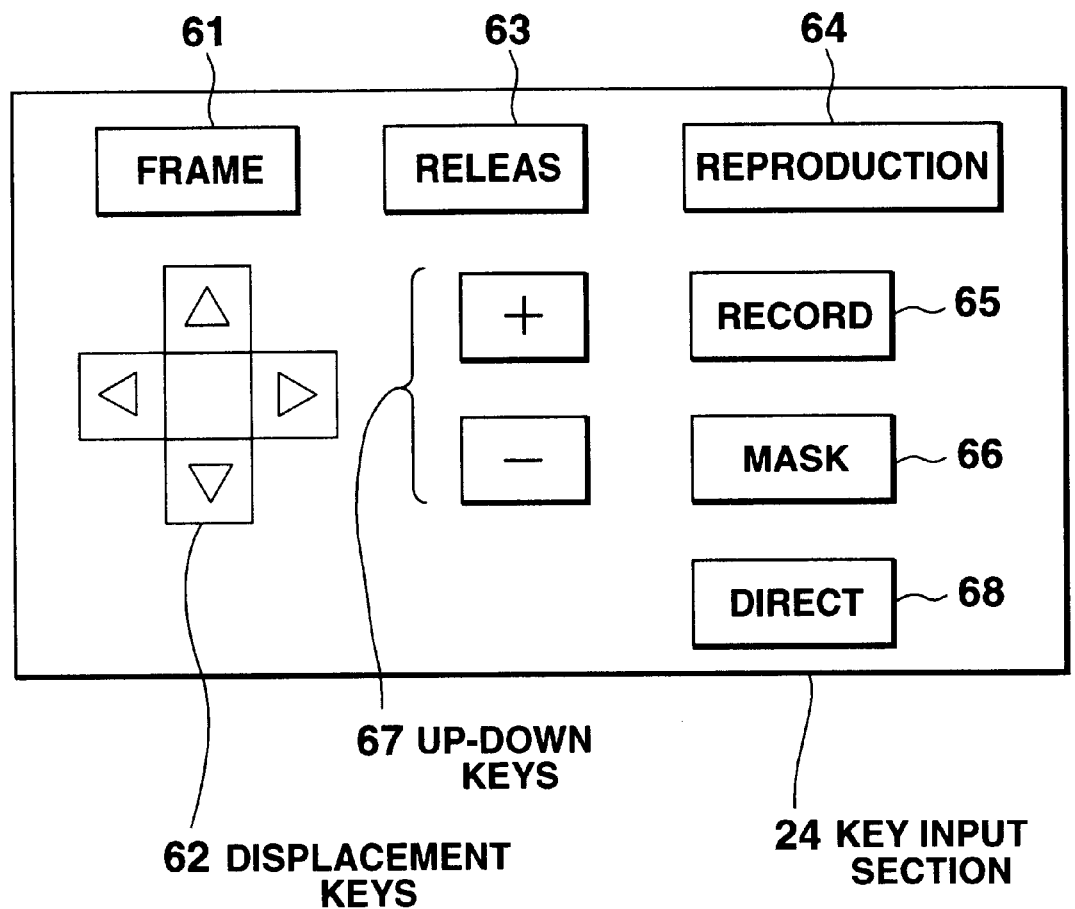
FIG. 2 is a diagram showing an example of construction of a key input section indicated in FIG. 1.

The key input section 24 is provided with various sorts of input keys or buttons, as indicated in FIG. 2, and sends state signals of corresponding keys or buttons to the CPU 21. Pointing devices such as an input pen, a touch pen, etc. may be added thereto apart from the key input section 24.

The I/O port 25 executes interface processing for data in- and output between the CPU 21 and external devices.

Further distance measuring means (not indicated in the figure) capable of measuring the distance to the object to be imaged may be disposed in the lens block 41 or the camera body 42. Apart from that the distance measuring means can be mechanical means, for example, in case where the digital camera has an autofocusing mechanism, it can be constructed as means for obtaining the distance to the object to be imaged b obtained by an autofocusing operation, starting from the focal length f of the imaging lens 1, a distance a between the imaging lens 1 and the CCD 2, and a displacement distance of the imaging lens 1. The distance measuring means can be constructed also by using an infrared emitting and receiving device.

EXAMPLE OF CONSTRUCTION OF THE KEY INPUT SECTION

FIG. 2 is a diagram showing a representative example of arrangement of keys or buttons in the key input section 24 disposed in the digital camera, to which the present invention is applied.

In FIG. 2, a frame button 61 is operated by the user, when a cut-out image is read-out from the cut-out image memory 14A; displacement keys 62 are operated, when a cursor displayed on the liquid crystal display 20 is displaced up-, down-, left- or rightward; a release button 63 is operated, when a taken image is stored in the flash memory 14; and a reproduction button 64 is operated, when a reproduction mode is set for the purpose of reproducing one of images stored in the flash memory 14 (including taken images, previously registered images, monochrome images, images registered in an IC card, etc.).

Further a recording button 65 is operated, when a record mode is set for the purpose of recording a taken image in the flash memory 14; a mask button 66 is operated, when a mask pattern (image) is reproduced; up-down keys 67 are operated, when the cursor 20 displayed on the liquid crystal display 20 or in case where an instruction to start execution of a function prescribed in a program, etc. are carried out; and a direct key 68 is operated in case where an instruction to start drawing by using a cursor or a pointing device (e.g. an input pen, a touch pen, etc.) is sent to the CPU 21.

PROCESSING MODES

Figure 3:
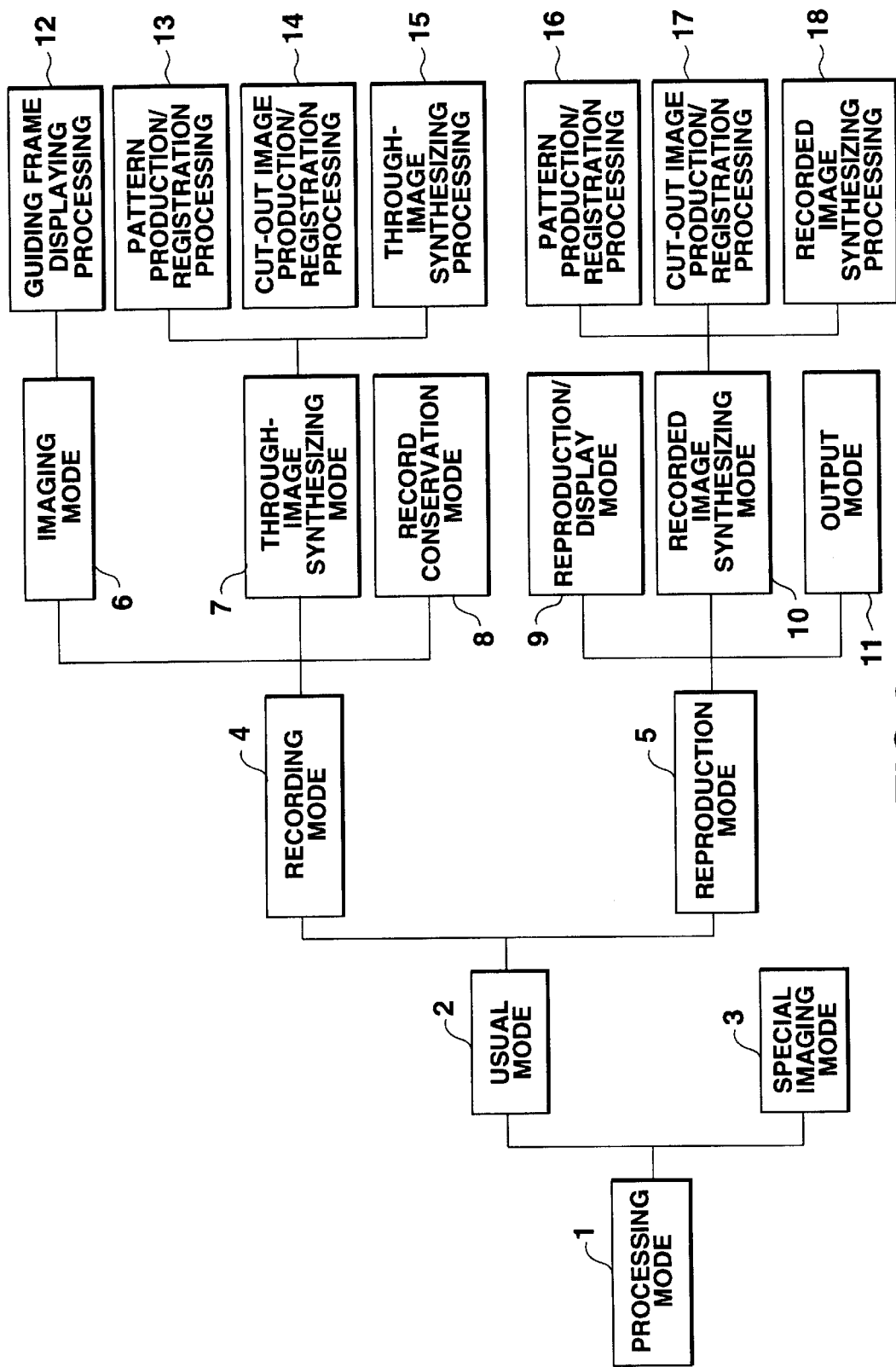
FIG. 3 is a diagram for explaining processing modes of the digital camera indicated in FIG. 1.

FIG. 3 is a diagram for explaining an example of construction of the processing modes of the digital camera indicated in FIG. 1. The processing modes of the digital camera can be classified roughly into a usual mode consisting of a recording mode and a reproduction mode and a special imaging mode such as a close imaging, etc. and switching-over of the usual mode and the special imaging mode is effected by switching-over of a processing mode switching-over switch.

When the processing mode is set at the usual mode, it proceeds at first to the recording mode. The recording mode includes an imaging mode, by which imaging of an object and through-image display are effected, a through-image synthesizing mode, and a record conservation mode, by which a desired through-image, a cynthesized image, etc. are recorded in a recording medium (the flash memory in the embodiment).

When the reproduction button 64 is pushed under the usual mode, the process proceeds at first to the reproduction mode. The reproduction mode includes a reproduction/display mode, by which an image recorded in the flash memory 14 is reproduced to be displayed, a recorded image synthesizing mode, and an output mode, by which image data (including also synthesized image data) can be outputted to an external device through the I/O port 25.

Mode judging means (constructed by a program in the embodiment) judges to which mode the process has proceeded by operation of the processing mode switching-over switch, key operation or button operation in the key input section 24 by the user. The mode judging means examines state signals from the keys and the buttons sent from the key input section 24 to the CPU 21 and the process proceeds to a corresponding mode processing circuit or program.

OPERATION OF THE DIGITAL CAMERA UNDER DIFFERENT MODES

Now operation of the digital camera indicated in FIG. 1 under different modes will be explained.

OPERATION UNDER THE RECORDING MODE

When the processing mode is set at the recording mode, the process proceeds at first to the imaging mode. By the imaging mode, image data of one frame taken-in periodically from the CCD 2 are displayed on the liquid crystal display 20 as a through-image.

When the mask button 66 or the frame button 61 is pushed under the imaging mode, the process proceeds to the through-image synthesizing mode, by which it is possible to form a mask pattern starting from a desired image, to synthesize an image by combining an image and a desired mask pattern or a cut-out image to be displayed, to effect image synthesis, etc.

Further, when the up-down key 67 is pushed, it is possible to display a guiding frame for imaging. On the other hand, when the release button is pushed, the mode proceeds to the record conservation mode, by which it is possible to record a desired through-image, a synthesized image, etc. in the flash memory 14.

(1) Imaging and Display of a Through-image

When the user pushes the recording button 65 under the recording mode, the CPU 21 sends an imaging instruction signal to the timing generator 12 to control is so as to effect taking-in of an image of an object. When the timing generator 12 receives the imaging instruction signal from the CPU 21, it drives the driving circuit 5 through the terminal 32 so as to take-in a video signal converted by the CCD 2. Since an optical image of an object, to which the imaging lens 1 is directed by the user, is focused on the CCD 2, the video signal photoelectrically converted by the CCD 2 is inputted to the A/D converting circuit 4 through the amplifier 3 owing to the fact that the CCD 2 is driven by the driving circuit 5.

The A/D converting circuit 4 A/D-converts the inputted video signal to have image data, which are supplied to the timing generator 12 through the terminal 31.

The timing generator 12 stores the inputted image data (Ye, Cy, Gr) in the DRAM 13. The CPU 21 reads-out the image data, which have been once stored in the DRAM 13, to supply them to the signal generator 16.

The signal generator 16 regulates white balance of these image data and at the same time it produces video data (YUV data) by encoding processing, which are temporarily stored in the VRAM 17. Further the signal generator 16 reads-out the video data drawn in the VRAM 17 to supply them to the D/A converting circuit 18.

The D/A converting circuit 18 D/A-converts these video data and outputs them to the liquid crystal display 20 through the amplifier 19 to be displayed there. In this way the image (through-image), which the user will monitor through the imaging lens 1, is displayed on the liquid crystal display 20. It is possible for the user to verify the object to be imaged by observing the image displayed on this liquid crystal display 20.

Further it is possible to produce in a simple manner video data for the through-image displayed on the liquid crystal display 20. For example, since luminance data and chrominance data can be produced by using only the Ye component among image data stored in the DRAM 13, it is possible to update rapidly an ever changing image (i.e. through-image) coming through the imaging lens 1 by using these data to display it on the liquid crystal display 20.

(2) Synthesis of a Through-image

At imaging mode, when the user pushes the mask button 66 or the frame button 61, the process proceeds to the through-image synthesizing mode.

In case where the mask button 66 is pushed, it is possible to cut-out a desired part of a through-image as a mask pattern to register it in the mask pattern memory 14B or to combine a desired part of the through-image with a desired mask pattern to synthesize a desired cut-out image. On the other hand, when the frame button 61 is pushed, it is possible to stick a desired cut-out image recorded in the cut-out image (clipped image) memory 14A to the through-image to synthesize a new image. Further operation of the digital camera 100 under the through-image synthesizing mode will be described later. (FIGS. 4A–4C, Embodiments 1 to 3, 7 and 8 to 10)

(3) Display of a Guiding Frame

When the up-down key 67 is pushed under the imaging mode, it is possible to display a guiding frame for imaging for a driving license, a photograph for passport, etc. Display operation of the guiding frame will be described later. Embodiment (4) Record Conservation of an Image On the other hand, when recording is instructed by operating the release button 63 under the recording mode, the CPU 21 supplies image data (including synthesized image data synthesized under the image synthesizing mode) stored in the DRAM 13 to the signal generator 16 to have it produce (encode) video data more precisely by using all of the Ye component, the Cy component and Gr component to display them on the liquid crystal display 20 as a still image.

Further the CPU 21 supplies these video data to the compression/extension circuit 15 and compression processing is executed there e.g. by the JPEG (Joint Photographic Experts Group) method. The compressed video data are recorded (written) in the flash memory 14.

Moreover information relating mask patterns, synthesized images and their background images (recorded images in this case) (e.g. image numbers of the synthesized images and the background images, sort of the mask patterns and their image numbers, image numbers of cut-out images, etc.) may be written in a link table 50 disposed on the flash memory 14 while making them correspond to each other. Further storage positions of different images and mask patterns may be written-in instead of the image numbers.

OPERATION UNDER THE REPRODUCTION MODE

When the reproduction button 64 is pushed under the usual mode, the process proceeds to the reproduction/display mode, a recorded image recorded in the flash memory 14 is read-out and reproduced to be displayed on the liquid crystal display 20. Every time the reproduction button is pushed, a succeeding image is read-out and reproduced to be displayed on the liquid crystal display 20. In this way it is possible for the user to obtain a desired image.

The apparatus may be so constructed that a fast-forwarding mode may be added thereto, by which, when the reproduction button is continuously pushed, displayed images are fast forwarded and when a finger is detached from the reproduction button, an image is displayed after that point of time.

When the mask button 66 for the release button 63 is pushed under the reproduction/display mode, the process proceeds to the recorded image synthesizing mode, by which it is possible to superpose a desired mask pattern or a cut-out image on a recorded image or to stick a desired cut-out image to a Recorded Image.

(1) Reproduction and Display of a Recorded Image

When the user operates the reproduction button 64 in the key input section 24 to set the reproduction/display mode, the CPU 21 reads-out video data of one image written in the flash memory 14 to supply them to the compression/extension circuit 15.

The compression/extension circuit 15 subjects them to extension processing to supply them to the signal generator 16.

The signal generator 16 adds a synchronizing signal, etc. to the received video data and reads-out the video data recorded in the VRAM 17 after having stored them temporarily in the VRAM 17 to supply them to the D/A converting circuit 18.

The D/A converting circuit 18 D/A-converts these video data and outputs them to the liquid crystal display 20 through the amplifier 19 to be displayed there. In this way it is possible to have the liquid crystal display 20 display the image recorded in the flash memory 14. Since this displayed image differs from the through-image, as described previously, and it is one taken-in after more precise processing, it can be displayed in a form clearer than the through-image.

(2) Synthesis of a Recorded Image

When the mask button 66 or the release button 63 is pushed under the reproduction/display mode, the process proceeds to the recorded image synthesizing mode. In case where the mask button 66 is pushed, it is possible to produce a desired mask pattern, starting from a recorded image, as a mask pattern, to superpose a desired pattern on the recorded image to be displayed, to stick a desired pattern to the desired recorded image to synthesize a new image.

In case where there is disposed a link table 50 and information relating mask patterns, cut-out images, synthesized images and their background images to each other is thereout therein, this information is updated at record conservation. Further operation under the recorded image synthesizing mode will be described later. (FIGS. 4A to 4C, Embodiments 4 to 6, 9 and 10)

IMAGE PROCESSING MEANS

Image processing means 100 executes image processing treatment under the usual mode. Although the image processing means 100 can be constructed by hardware circuits, in the present embodiment the image processing means 100 is constructed by a program. Further certain modules among different modules of the image processing means 100 may be constructed by hardware circuits, while other modules are constructed by a program.

The different modules of the image processing means 100 constructed by a program are recorded in the ROM 22 or the flash memory 14 and executions thereof are controlled by the CPU 21 under control of a control program to realize various sorts of image processing treatments in the present embodiment.

FIGS. 4A to 4C are block diagram showing an example of construction of the image processing means 100. The image processing means 100 includes through-image synthesis processing means 110, recorded image synthesis processing means 120 and inner frame display processing means 130.

THROUGH-IMAGE SYNTHESIS PROCESSING MEANS

Through-image synthesis processing means 110 includes processing method judging means 111, which judges an image processing method, in case where the process is switched-over from the imaging mode to the through-image synthesizing mode under the recording mode; pattern production/registration means 122, which extracts a desired mask pattern from a through-image to register it in the mask pattern memory 14B; cut-out image production/registration means 113, which superposes a desired mask pattern on a through-image to display it and produces a desired clipped image, starting from the through-image superposed and displayed and the desired pattern, to register it in the cut-out image memory 14A; and through-image synthesizing means 114, which superposed a desired cut-out image on a through-image to be displayed and subjects the through-image and the cut-out image to sticking synthesizing processing.

The processing method judging means 111 is started, when the process proceeds from the mode judging means to the through-image synthesis processing means 110 and judges a result of operation (state signal) of the user, which the CPU 21 has received from the key input section 24. In case where the result of operation of the user represents push-down of the mask button 66, it starts the pattern production/registration means 113 and for push-down of the release button it starts the through-image production/registration means 114.

As an option, in case where the link table 50 is disposed in the flash memory 14, processing information giving means 115 producing information registered in the link table 50 including e.g. image numbers indicating relations between background images and synthesized images, pointer information indicating relations between background images and cut-out images or mask patterns, etc. may be constructed so as to be incorporated in a latter stage of the through-image synthesizing means.

The pattern production/registration means 112 includes binary coded pattern production means 1121 and luminance component processing pattern production means 1122.

The pattern production/registration means 112 is started by the processing method judging means 111, in case where the user pushes the mask button 66 at a desired angle while observing a through-image, when he finds an object desired as a mask pattern and images it under the imaging mode or when he draws a pattern to be registered as a mask pattern on a sheet of paper or a plate, which he wants to register as a mask pattern, and images it (e.g. FIG. 8A), takes-in the through-image (pattern candidate image) in the DRAM 13, and starts the binary coded pattern production means 1121 so that the taken-in pattern candidate image binary coded to display the binary coded pattern (FIG. 8B) on the liquid crystal display 20. In this way, when the up-down key 67 is pushed, luminance component processing pattern production means 1122 is started, which takes-in the luminance component of the pattern candidate image in a predetermined number of bits (8 bits in the embodiments) to modify the luminance component and displays an extracted pattern (FIG. 8C) on the liquid crystal display 20. Here, when the release button 63 is pushed, the extracted pattern is registered (recorded) in the mask pattern memory 14B. (EMBODIMENT 1)

The pattern production/registration means 112 may be constructed so as to include pattern production means 1125, by which a pattern of an object image desired as a mask pattern is extracted by effecting a contour extracting processing for detecting the contour of the object to extract it.

Further the pattern production/registration means 112 may be constructed so as to include pattern production means 1125, so constructed that a pattern is extracted by the fact that the user moves the cursor on the screen of the liquid crystal display section 20 by using the displacement keys 62 and traces the contour of an image of a desired object as a mask pattern. Moreover the pattern production means 1125 may be so constructed that the mask pattern can be extracted by tracing the contour of the image of the object in the through-image, in case where, in FIG. 1, as input means other than the keys and the buttons in the key input section 24 indicated in FIG. 2, the liquid crystal display section 20 is so constructed that a transparent position detecting sensor (not indicated in the figure) is disposed on the screen and the user can indicate a pattern thereon by means of a pointing device (not indicated in the figure) such as a tough pen, etc. or a finger. (Embodiment 8)

Mask patterns to be registered may be diagrams, designs and frames (e.g. a frame for imaging having a size of a photograph for driving license, a frame for imaging having a size of a photograph for passport, a frame for imaging indicating a size of a desired image, etc.).

Further they may be various general objects to be imaged such as matters, animals, plants, building, attached installations as signboards, landscapes, natural phenomena, etc., if they can be imaged and extracted as mask patterns. Moreover, for a plurality of imaged objects included in such a general image, it is possible also to produce a mask pattern at reproduction by extracting parts corresponding to a same distance. In this case, the pattern production/registration means 112 is so constructed that it comprises distance data storing means 1126, which obtains distances from distance measuring means to objects to be imaged at a plurality of points in an image and stores them together with image data. (Embodiment 9) It is preferable to write measured distance data in the link table 50, which will be described later.

The pattern production means 1125 may be so constructed also that the user draws a trajectory by moving the cursor on the screen of the liquid crystal display section 20 by means of the displacement keys 62 and a figure thus drawn is cut-out as a mask pattern. In case where the liquid crystal display section 20 is so constructed that a transparent position detecting sensor (not indicated in the figure) is disposed on the screen and the user can indicate a pattern thereon by means of a pointing device (not indicated in the figure) such as a tough pen, etc. or a finger, the pattern production means 1125 may be so constructed that the user draws a figure while pointing on the screen of the liquid crystal display section 20 and the figure thus drawn is cut-out as a mask pattern. Further, in case where the position detecting sensor is constructed by a contact type detecting sensor such as touch electrodes, a figure, which the user has drawn by touching the screen with a finger, can be cut-out. (Embodiment 10)

The cut-out image production/registration means 113 cuts-out a desired part in a through-image by using a desired mask pattern registered in the mask memory 14B to register (record) it in the cut-out image memory 14A. (Embodiment 2)

In this case, the user selects desired one among mask patterns displayed on the screen. In case where a desired part of a through-image is cut-out by using a selected mask pattern, the mask pattern and the through-image are combined on the screen to be displayed on the liquid crystal display 20 in order to position the through-image (or the mask pattern) thereon. However, since such an image display (hereinbelow called preview image display) takes much time, the cut-out image production/registration means 113 can be so constructed that it comprises display coordinate determining means, which effects a preview display at a high speed, in order to effect the preview display more rapidly. (Embodiment 11)

The through-image production means 114 combines a cut-out image registered in the cut-out image memory 14A with a desired image among through-image under the imaging mode and registers (records) an image thus synthesized in the flash memory 14. (Embodiment 3) In this case it is possible for the user to move the through-image by moving the camera so that the cut-out image is superposed thereon at a desired angle. Further it is possible also not to move the camera, but to move the displayed cut-out image so that it is superposed on a desired part of the through-image.

In this case, the user selects desired one among cut-out images displayed on the screen. Further, in case where the synthesis is effected by sticking the selected cut-out image to a desired part of the through-image, the cut-out image and the through-image are displayed on the screen to be positioned thereon. The through-image synthesizing means 114 can be so constructed that it comprises display coordinate determining means, which effects a preview display at a high speed, in order to effect the preview display more rapidly, similarly to the Cut-out image production/registration means 113. (Embodiment 11)

The through-image synthesizing means 114 can be so constructed also that it comprises resolution determining means, which determines automatically resolution in case where a synthesized image is compressed to be registered in the flash memory 14 by using resolution of the cut-out image, resolution of the through-image, etc. (Embodiment 12)

RECORD IMAGE SYNTHESIZING PROCESSING MEANS

The recorded image synthesizing processing means 120 includes the processing method judging means 121, which judges the image processing method in case where the mode is switched-over from the reproduction/display mode to the recorded image synthesizing mode under the reproduction mode; the mask pattern production/registration means 122, which extracts/produces a mask pattern from a recorded image to register it in the mask pattern memory 14B; the cut-out image production/registration means 123, which superposes a desired pattern on a recorded image to display it and cut-out a cut-out image from the recorded image thus superposed and displayed by using the desired pattern to effect processing for producing a desired cut-out image; and the recorded image synthesizing means 124, in which the desired cut-out image is superposed on the recorded image to display them and the desired cut-out image is stuck to the desired recorded image.

As an option, in case where the link table 50 is disposed in the flash memory 14, processing information giving means 125 producing information registered in the link table 50 including e.g. image numbers indicating relations between background images and synthesized images, pointer information indicating relations between background images and cut-out images or mask patterns, etc. may be constructed to as to be incorporated in a latter stage of the recorded image synthesizing means 124.

The processing method judging means 121 is started, when the process proceeds from the mode judging means to the recorded image synthesizing processing means 120, and a judges a result of operation (state signal) of the user, which the CPU 21 has received from the key input section 24. In case where the result of operation of the user is push-down of the mask button 66, it starts the pattern production/registration means 122. On the other hand, for push-down of the frame button 61 it starts the cut-out image production/registration means 123 and for push-down of the release button it starts the recorded image synthesizing means 124.

The pattern production/registration means 122 includes binary coded pattern production means 1221 and luminance component processing pattern production means 1222.

Here, since the binary coded pattern production means 1221 and the luminance component processing pattern production means 1222 have same constructions as the binary coded pattern production means 1121 and the luminance component processing pattern production means 1122 described previously, it is preferable that they are constructed as common modules and that when the pattern production/registration means 112 of the pattern production/registration means 122 is started, the circuit is branched to these modules and as soon as the processing is terminated, they are returned to the pattern production/registration means 112 or the pattern production registration means 122.

The pattern production/registration means 122 is started by the processing method judging means 121, in case where the user finds a image desired as a mask pattern among recorded images reproduced and displayed under the reproduction/display mode and pushes the mask button 66, writes the image in a work area disposed in the DRAM 13, and makes the circuit branch to the binary coded pattern production means 1221. When the processing is terminated, it returns and an extracted binary coded pattern (FIG. 16C) is displayed on the liquid crystal display 20. In this case, when the up-down key is pushed, the circuit branches to the luminance component processing pattern production means 1222 and when the processing is terminated, it returns and an extracted pattern (FIG. 16D) is displayed on the liquid crystal display 20. Here, when the release button 63 is pushed, the extracted pattern is registered (recorded) in the mask pattern memory 14B. (Embodiment 4)

The pattern production/registration means 122 may be constructed so as to include the pattern production means 1225., for extracting a pattern of an object image desired as a mask pattern by effecting a contour extracting processing, similarly to the pattern production/registration means 112 described previously.

Further the pattern production means 1225 may be so constructed that, when the user designates a distance at reproduction, on the basis of the stored distance data, parts of an image, which are in accordance therewith, are extracted to produce a mask pattern. (Embodiment 9)

Further, similarly to the pattern production/registration means 112 described previously, the pattern production/registration means 122 may be constructed so as to include pattern production means 1225, in which the user moves the cursor on the screen of the liquid crystal display section 20 by using the displacement keys 62 to draw a trajectory and a figure thus drawn is extracted as a mask pattern. Similarly, in case where a transparent position detecting sensor is disposed on the screen of the liquid crystal display section 20 as input means and it is so constructed that relevant points can be indicated by means of a pointing device, the pattern production means 1225 may be so constructed that the user draws a figure while pointing on the screen of the liquid crystal display section 20 and the drawn figure is cut-out as a mask pattern. It is similar to that described previously at a point that, when the position detecting sensor is constructed by contact type detecting elements, a figure drawn by the user while touching the screen with a finger can be cut-out. (Embodiment 10)

Moreover, similarly to the case of the pattern production registration means 112, mask patterns to be registered may be diagrams, designs and frames (e.g. a frame for imaging having a size of a photograph for driving license, a frame for imaging having a size of a photograph for passport, a frame for imaging indicating a size of a desired image, etc.), matters, animals, natural phenomena, etc,. if they can be extracted as a mask pattern.

The cut-out image production/registration means 123 cuts-out a desired part in a through-image by using a desired mask pattern registered in the mask pattern memory 14B to register (record) it in the cut-out image memory 14A. (Embodiment 5)

In this case, the user specifies and selects desired one among mask patterns displayed on the screen. In case where a desired part of a recorded image is cut-out by using a selected mask pattern, the mask pattern and the recorded image are combined on the screen to be displayed on the liquid crystal display 20 in order to position them thereon. Similarly to the cut-out image production/registration means 113, the cut-out image production/registration means 123 can be so constructed that it comprises display coordinate determining means, which effects a preview display at a high speed. (Embodiment 11)

The recorded image production means 124 combines a cut-out image registered in the cut-out image memory 14A with a desired part of a desired image among reproduced recorded images and records an image thus synthesized in the flash memory 14. (Embodiment 6)

It is possible also for the user to move the displayed cut-out image so that the cut-out image is superposed on the desired part of the reproduced image serving as a background. On the contrary, it is possible also to move the reproduced image serving as a background so that the cut-out image is superposed thereon at a desired angle.

In this case, the user selects desired one among cut-out images displayed on the screen. Further, in case where the synthesis is effected by sticking the selected cut-out image to a desired part of the recorded image, the cut-out image and the recorded image are displayed on the screen to be positioned thereon. The recorded image synthesizing means 124 can be so constructed that it comprises display coordinate determining means, which effects a preview display at a high speed, in order to effect the preview display more rapidly, similarly to the through-image synthesizing means 114, in order to increase the speed of such a preview display. (Embodiment 11)

The recorded image synthesizing means 124 can be so constructed also that it comprises resolution determining means, which determines automatically resolution in case where a synthesized image is compressed to be registered in the flash memory 14 by using resolution of the cut-out image, resolution of the recorded image, etc. (Embodiment 12)

GUIDING FRAME DISPLAY PROCESSING MEANS

By using guiding frame display processing means 130 it is possible to obtain an image having a desired size by the fact that a guiding frame pattern such as a guiding frame for license photograph, etc., registered in the mask pattern memory under the imaging mode, is displayed on the liquid crystal display 20 and that a photographer images/records while regulating the camera angle so that an image of an object is settled within the displayed guiding frame. Further it is desirable to store size information and images in the link table 50 at recording, making it correspond to images, in order that the image can be printed at a desired size at printing.

Link Table

Figure 5A:
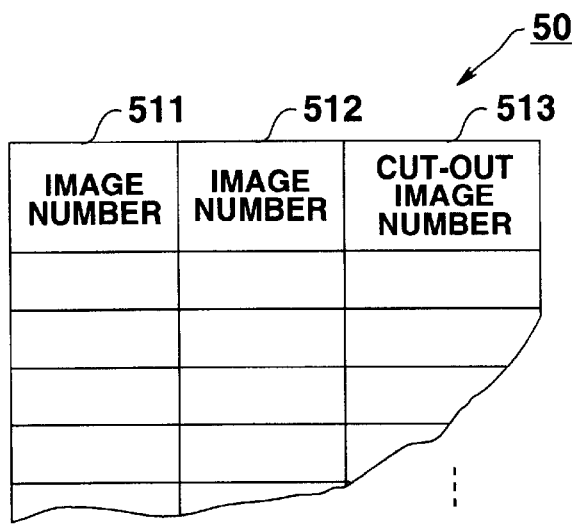
FIGS. 5A to 5C are diagrams showing examples of a link table.
Figure 5B:
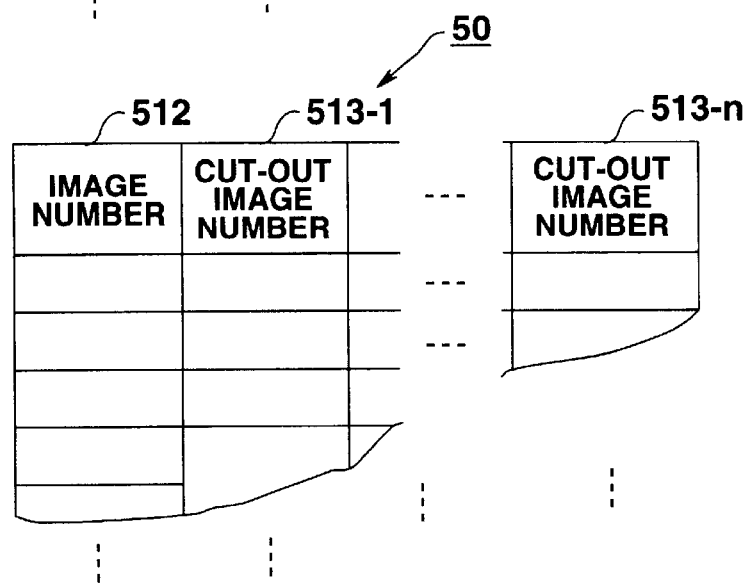
Figure 5C:
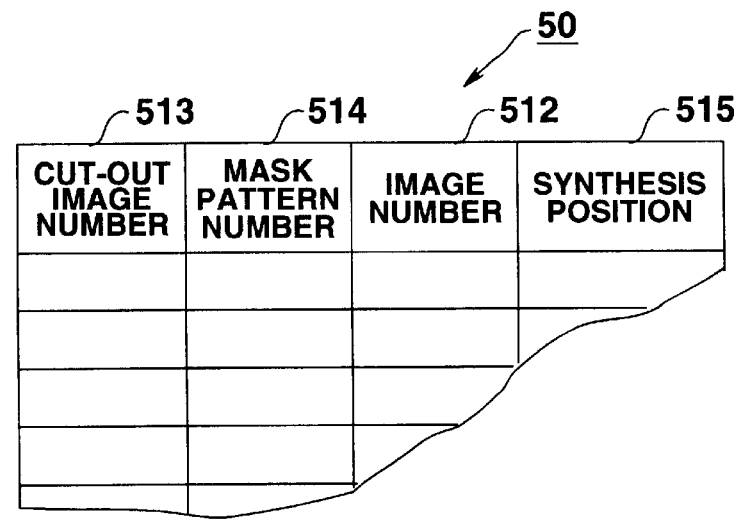

FIGS. 5A to 5C are diagrams for explanation indicating examples of construction of the link table. The link table 50 can store information relating synthesized images and their background images (recorded images in this case) to each other on the flash memory 14, i.e. image numbers of the synthesized images and their background image, sorts and image numbers of patterns, image numbers of cut-out images, etc.

FIG. 5A indicates an example of the link table, in which synthesized images, background images, and cut-out images are corresponded to each other, in case where the synthesized images are recorded in the flash memory 14 after sticking synthesis. Image numbers of the synthesized images are stored in an image number column 511; image numbers of the background images are stored in another image number column 512; and numbers of cut-out images stored in the cut-out image memory 14A are stored in a cut-out image number column 513.

FIG. 5B indicates an example of the link table, in which synthesized images are not recorded after sticking synthesis and information making the synthesized images, background images, and cut-out images correspond to each other is registered, and in which numbers of synthesized cut-out images obtained by combining synthesized images with a background image having an image number registered in the image number column 512 are recorded in cut-out image number columns 513-1~513-n (n≧1).

FIG. 5C indicates an example of the link table, in which information making cut-out images used at cut-out image production, background images (synthesized images may be used as background images) and mask patterns correspond to each other is registered. Numbers of mask patterns used at producing cut-out images having cut-out image numbers recorded in the cut-out image number column 513 among mask patterns recorded in the mask pattern memory 14B are recorded in a mask pattern number column 514. Position information (coordinates) of the background images, for which mask patterns are positioned on the background images at cut-out image production, is recorded in a synthesis position column 515.

In case where the pattern production/registration means 122 is constructed so as to include the image distance data storing means 1226, it is so constructed that there are disposed a plurality of distance columns for one image so that distance data to designated objects to be imaged can be recorded there. It is possible also that a print size column designating the size of printed images at image printing is disposed, in which a value of the print size or a code corresponding to the print size can be recorded.

Embodiments

FIGS. 6A to 6C are diagrams for explaining an example of synthesis (sticking synthesizing processing) of an image with a cut-out image under the through-image synthesizing mode or the recorded image synthesizing mode.

It is supposed that an image indicated in FIG. 6A is a through-image displayed on the liquid crystal display 20 under the imaging mode or a recorded image reproduced under the reproduction mode. It is supposed further that a cut-out image as indicated in FIG. 6B is stored in the DRAM 13 or it is previously stored in the cut-out image memory 14A. In this case, in the sticking synthesizing processing the image indicated in FIG. 6A is combined with the cut-out image indicated in FIG. 6B to synthesize a new image and in this way a synthesized image indicated in FIG. 6C is produced.

Hereinbelow embodiments under the through-image synthesizing mode and the recorded image synthesizing mode will be explained.

EMBODIMENT 1

Pattern Production/registration Processing (Mask Pattern Production/registration Starting from a Through-image)

The present embodiment is one of the pattern production/registration means 112, which is an example, in which a desired mask pattern is extracted by background processing starting from a through-image under the through-image synthesizing mode to be registered in the mask pattern memory 14B.

Figure 7:
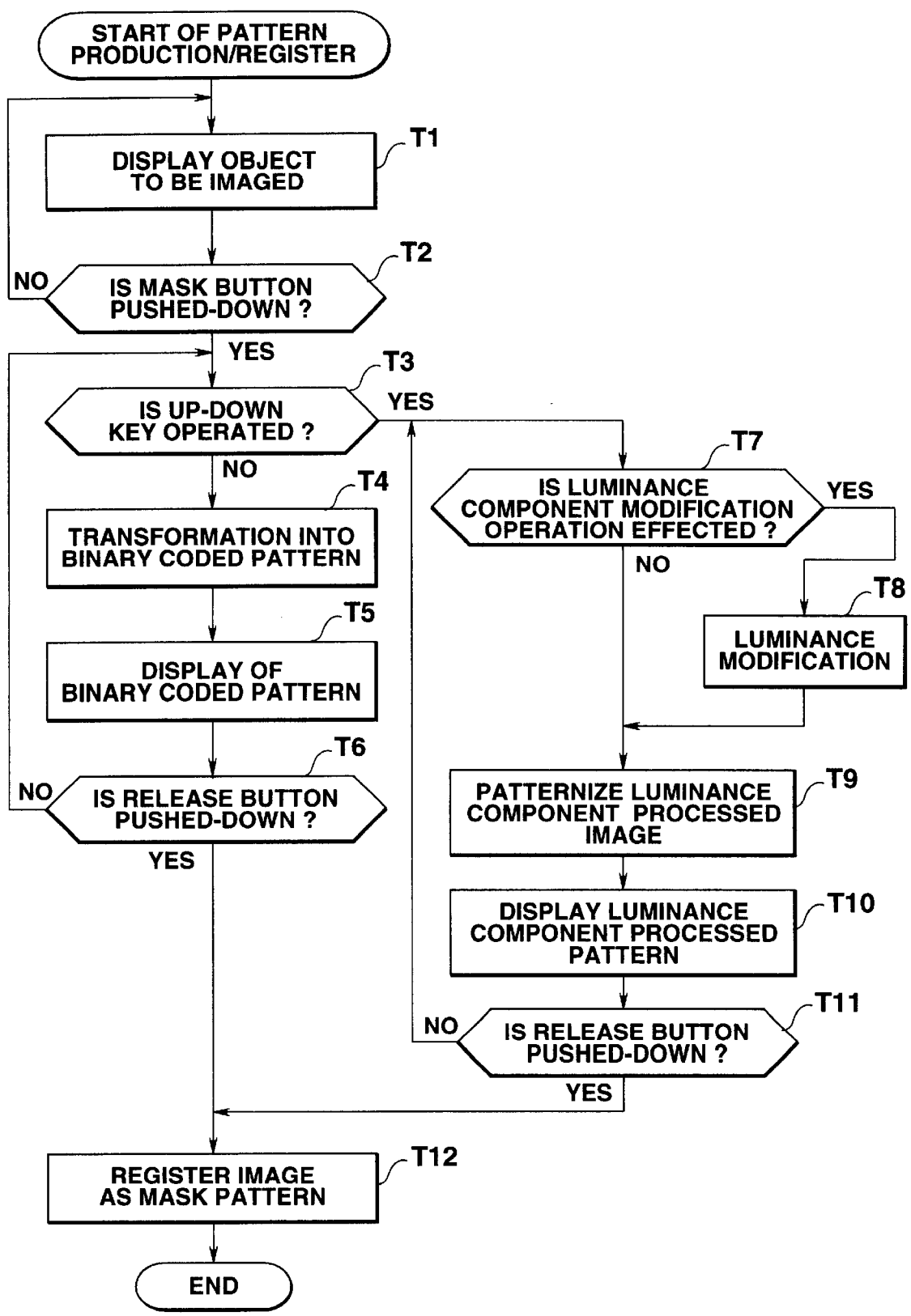
FIG. 7 is a flow chart showing an embodiment of a pattern production/registration processing operation.

FIG. 7 is a flow chart indicating an embodiment of the pattern production/registration processing operation and FIGS. 8A to 8C are diagrams for explaining a pattern production/registration process on the basis of the flow chart indicated in FIG. 7.

In FIG. 7, an image (in this embodiment a heart mark drawn on a sheet of paper or a plate) as indicated in FIG. 8A, which the user wants as a mask pattern, is taken under the imaging mode. The object image (heart mark) is taken temporarily in the DRAM 13 to display a through-image (T1).

Then, when the user removes the camera while observing the through-image and operates the mask button 66 at a desired angle, the CPU 21 writes the image data stored temporarily in the DRAM 13 in a work area of the DRAM 13 (T2).

Here the CPU 21 examines whether the user has operated the up-down keys 67 or not. In case where the up-down keys 67 have been operated, the process proceeds to T7 (T3), while in case where they have not been operated, the object image (image data) written in the work area is subjected to a background processing and further to a binary coding processing after having been cut-out (T4).

After the binary coding processing the signal generator 16 transforms these binary coded image data into video data, which are drawn in the VRAM 17.

Thereafter the video data drawn in the VRAM 17 are read-out and outputted to the liquid crystal display 20 to be displayed there. In this way, a result (a through-image) obtained by processing a patterning candidate image, which the user monitors through the imaging lens 1, into a binary coded pattern is displayed on the liquid crystal display 20. The user can verify the pattern (FIG. 8B), which he wants, by observing this image displayed on the liquid crystal display 20 (T5).

Here the CPU 21 examines whether the user has operated the release button 63 or not. In case where the release button has been pushed-down, the process proceeds to T12, while it has not been pushed-down, the process returns to T3 (T6).

In case where the up-down key 67 has been operated in the step T3, it is examined whether a luminance component modification operation has been effected or not. Presence or absence of the luminance component modification operation is judged by the fact that either the plus and minus keys have been pushed-down at the same time or either one of them has been pushed-down (T7). In case where they have been pushed-down at the same time, it is supposed that no modification operation has been effected and the process proceeds to T9 and on the other hand, in the case where either one of them has been pushed-down, it is supposed that a modification operation has been effected and the process proceeds to T8 (T7).

In case where the up-down key 67 (+) is operated in the step T3, the luminance value is shifted by a predetermined value at a time (1 by 1 in the present embodiment) towards higher values and on the other hand, in case where the up-down key 67 (−) is operated, the luminance value is shifted by a predetermined value at a time (1 by 1 in the present embodiment) towards lower values. Consequently it is possible to modify the luminance value of the pattern by operating the up-down key 67 (+) or the up-down key 67 (−) (T8).

The luminance value of the patterning candidate image written in the work area of the DRAM 13 is taken-in 8 bits to be patternized (T9).

Every time either one of up-down keys 67 is operated, the signal generator 16 transforms luminance processed image data into video data to draw them in the VRAM 17. Thereafter the video data drawn in the VRAM 17 are read-out and outputted to the liquid crystal display 20 to be displayed. In this way a result (through-image) obtained by processing the patterning candidate image, which the user monitors through the imaging lens 1, into the luminance processed pattern is displayed on the liquid crystal display 20. It is possible for the user to verify the pattern (FIG. 8C) by observing the image displayed on the liquid crystal display 20 (T10).

Here the CPU 21 examines whether the user has operated the release button 63 or not. In case where the release button 63 has been operated, the process proceeds to T12 and on the other hand, in case where the release button 63 has not been operated, the process returns to T7 (T11).

In case where the release button 63 has been pushed-down in the steps T6 or T11, i.e. in case where the desired mask pattern (FIG. 8B or 8C) has been obtained, the CPU 21 cuts-out the pattern displayed at that time as a mask pattern to register it in the mask pattern memory 14B (T12).

The image of the luminance component processed pattern obtained in the step T10 is a pattern giving such a feeling that neighborhoods of the boundary of the pattern are blurred, as indicated in FIG. 8C. In this way it is possible to obtain a cut-out image giving a blurred feeling as indicated in FIG. 11D stated later (cut-out image).

According to the present embodiment, since a drawn figure can be imaged and extracted/registered as a mask pattern, it is possible to register the mask pattern in an extremely simple manner. In addition, since preferred patterns can be designed and registered, e.g. trial production of trade marks, corporation marks, etc. can be effected easily, owing to a synthesizing processing, etc. stated later, on the basis of a designed pattern.

Although in the above explanation an example, in which a drawn figure is imaged and extracted/registered as a mask pattern, has been described, the present invention is not restricted thereto, but it is possible also to image an object, which the user wants to patternize, among landscapes of towns or streets, posters, signboards, magazines, etc., to patternize it.

As such examples, following can be cited:

(A) As described in said Embodiment 1, an example, in which the cursor is displaced on the screen; the contour of an image desired as a mask pattern is traced; and a pattern is extracted;

(B) an example, in which a transparent position detecting sensor is disposed on the screen; and the contour of a through-image is traced to be extracted as a pattern by means of a pointing device, etc. such as s touch pens, etc. (Embodiment 8);

(C) an example, in which a figure, which the user has drawn by moving the cursor on the screen, is inputted to be extracted (Embodiment 9); and (D) an example, in which a transparent position detecting sensor is disposed on the screen; and a figure is drawn on the screen by means of a pointing device such as a touch pen, an input pen, etc. to be extracted as a mask pattern.

EMBODIMENT 2

Cut out Image Production/registration Processing
(Cut-out Image Production/registration Processing Starting from a Through-image and a Mask Pattern)

The present embodiment is one of the image production/registration means 113, in which a through-image and registered mask pattern are suitably combined to obtain a synthesized image, which will be a cut-out image, which is cut-out to be registered.

Figure 9:
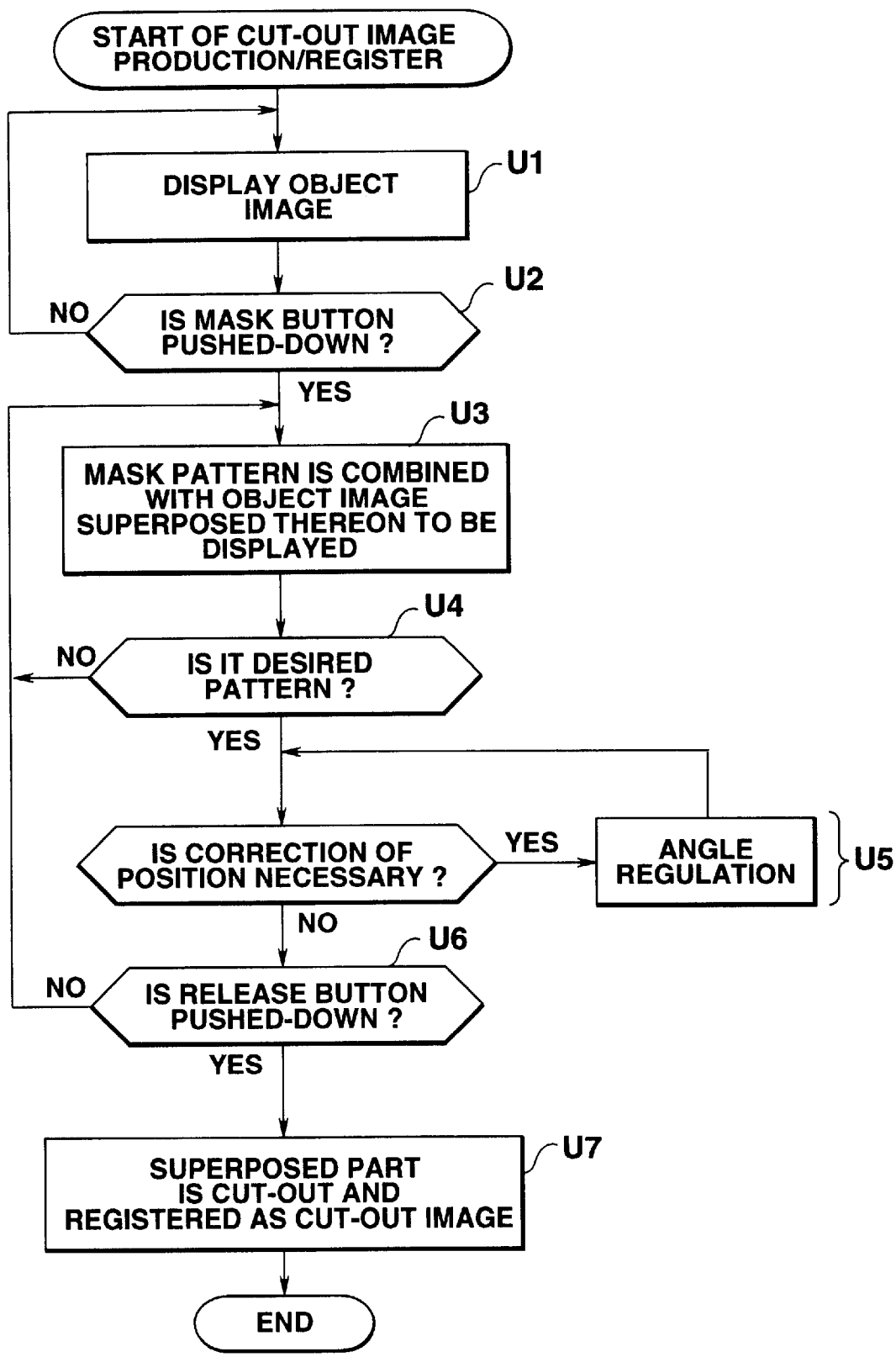
FIG. 9 is a flow chart showing an embodiment of a cut-out image production/registration processing operation.

FIG. 9 is a flow chart showing an embodiment of the cut-out image production/registration processing operation and FIGS. 10A–10D and 11A to 11D are diagrams for explaining the cut-out image production/registration process, on the basis of the flow chart indicated in FIG. 9. Hereinbelow explanation will be made, taking a case where the user uses an object image as indicated in FIG. 10A as a cut-out image as an example.

In FIG. 9, an object as indicated in FIG. 10A, which the user desires as a cut-out image, is imaged and an object image thus obtained is taken temporarily in the DRAM 13 to be displayed as a through-image (U1).

Here the CPU 21 examines whether the mask button 66 has been operated or not (S2).

When the user pushes the mask button 66 the CPU 21 reads-out a mask pattern stored in the mask pattern memory 14B; draws it in the VRAM 17 through the signal generator 16; reads-out the mask patten drawn in the VRAM 17; and displays it on the liquid crystal display 20 through the D/A converting circuit 18 and the amplifier 19. In this way, e.g.

a mask pattern as indicated in FIG. 10B is superposed on the through-image as indicated in FIG. 10A and displayed on the liquid crystal display 20 as indicated in FIG. 10C. In this case the mask pattern is positioned at the center of the screen (U3).

Here, when the mask button 66 is pushed again, a succeeding mask pattern is read-out and superposed on the through-image to be displayed and the user judges whether the mask pattern displayed on the liquid crystal display 20 is desired one or not. In case where it is not the desired pattern, the user continues to push the mask button 66, until the desired mask pattern appears. When it appears, it is combined with the through-image, superposed thereon, to synthesize a new image, which is displayed (U4).

In the step U4, when the mask pattern is displayed, in case where the user judges that it is necessary to correct the position of the through-image, while observing the through-image, on which the mask pattern is superposed in the step U4 (e.g. because a desired part of the through-image is not superposed on the mask pattern at the center of the screen), the user moves the camera and regulates the angle so that the desired part of the through-image is superposed on the mask pattern at the center of the screen. In case where it is not necessary to correct the position of the through-image, the user pushes the release button (U5).

The CPU 21 examines whether the user has pushed the release button 63 or not (U6). In case where the release button 63 has been pushed, the part of the image (FIG. 10D) displayed on the liquid crystal display 20 is cut-out to be registered in the cut-out image memory 14A (U7).

Although, in the step U5 in FIG. 9, the user has moved the camera to correct the position of the through-image so that the desired part of the through-image is superposed on the mask pattern at the center of the screen, the step U5 may be so constructed that the user operates the displacement keys 62 (or input means such as a pointing device, etc.) to displace the mask pattern.

When the cut-out image, which the user himself has made, is registered in the cut-out image memory 14A in the manner as described above, it is possible to effect a synthesizing processing as described later (Embodiments 3 and 5).

FIG. 10B is a binary coded pattern and in this case, the boundary of the cut-out image is clear, as indicated in FIG. 10D. On the contrary, if a cut-out image as indicated in FIG. 11D is produced by using a luminance processed pattern as indicated in FIG. 11B in the above embodiment, it is possible to obtain a cut-out image having a blurred boundary.

Although, in the step U7 in FIG. 9, a part of image displayed on the liquid crystal display 20 is cut-out to be registered, the apparatus may be so constructed that it is not registered at imaging, but it is registered at the cut-out image production/registration processing.

EMBODIMENT 3

Sticking Synthesizing Processing (Synthesis by Combining a Through-image with a Cut-out Image)

The present embodiment is one of the synthesizing means 114, which is an example in which a through-image and a cut-out image registered in the cut-out image memory 14A are combined to synthesize a new image under the through-image synthesizing mode.

Figure 12A:
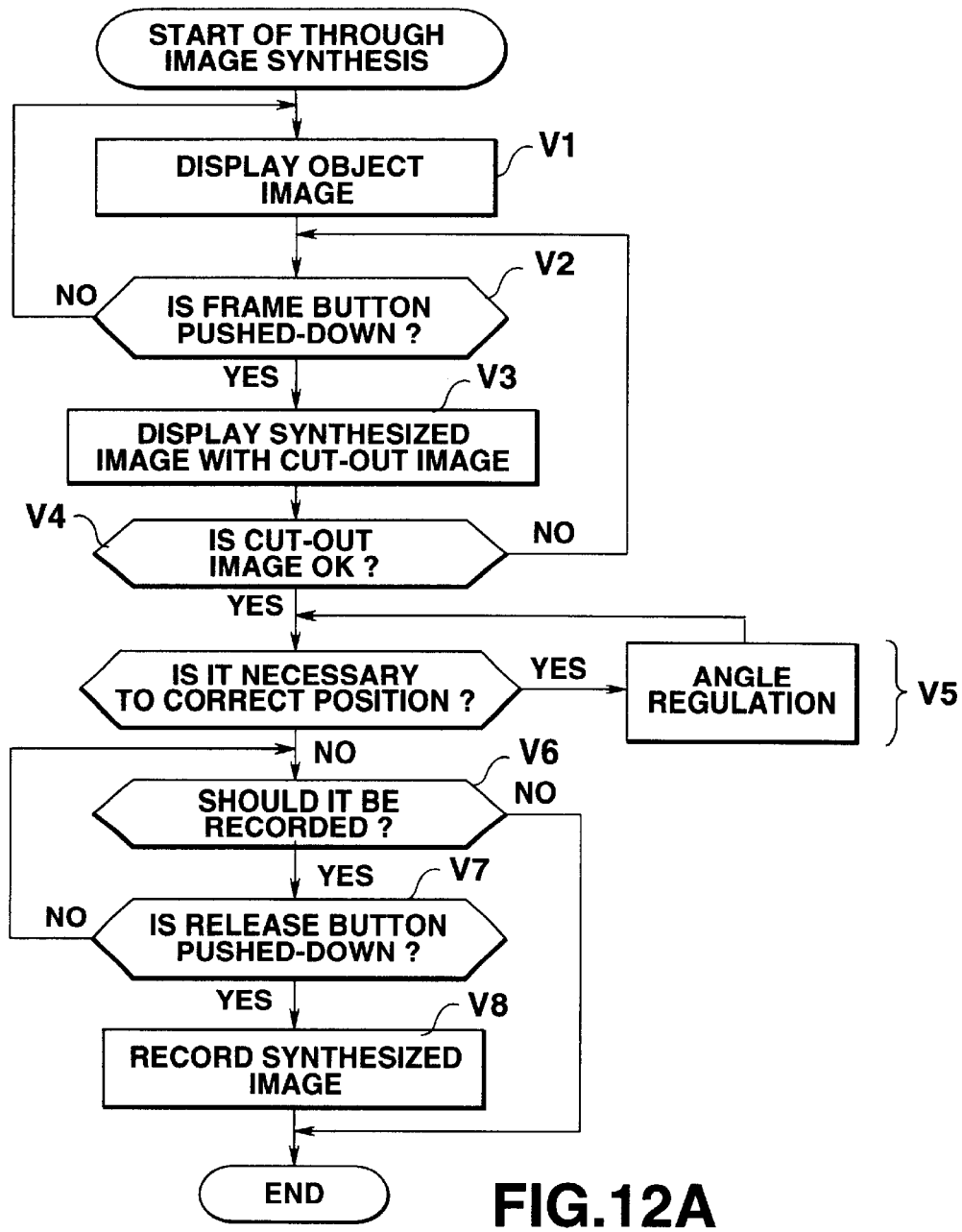
FIGS. 12A and 12B are flow charts showing an embodiment of a cutting-out image synthesis processing operation of the digital camera indicated in FIG. 1.
Figure 12B:
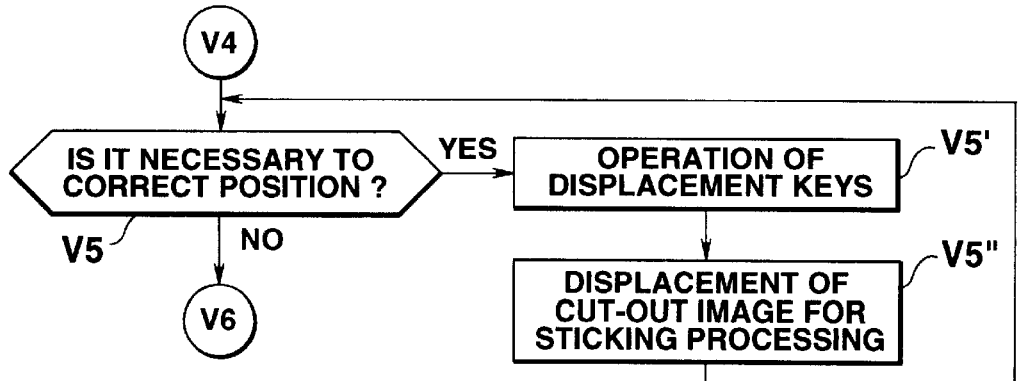

FIGS. 12A and 12B are flow charts showing embodiments of the sticking synthesizing processing operation by means of the digital camera indicated in FIG. 1 and FIGS. 13A to 13D, 14A and 14B are diagrams for explaining the sticking synthesizing process, on the basis of the flow charts indicated in FIGS. 12A and 12B.

In FIG. 12A, the user images a desired object under the imaging mode and an object image is taken in the DRAM 13 to display a through-image (V1).

Figure 13A:
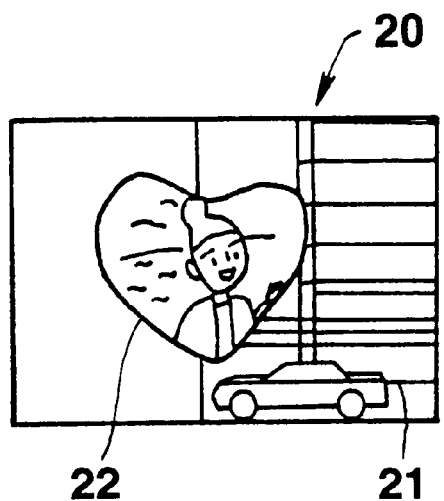
FIGS. 13A to 13D are diagrams for explaining a cut-out image synthesizing process, based on the flow chart indicated in FIGS. 12A and 12B.
Figure 21:
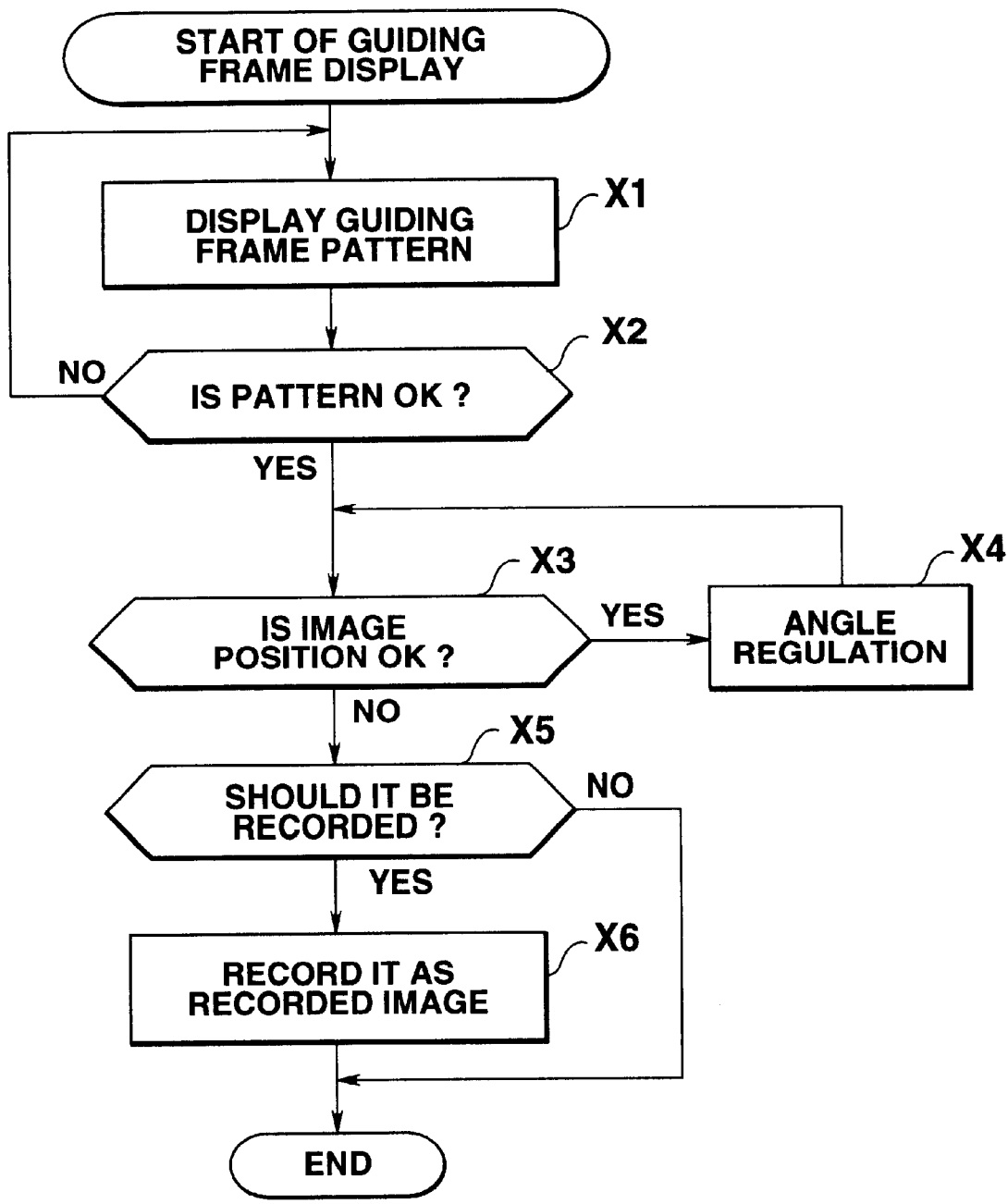
FIG. 21 is a flow chart showing an embodiment of a guiding frame display processing operation of the digital camera indicated in FIG. 1, taking photographing for a certificate using a photographic frame for certificate as an example.

Next, when the user pushes the frame button 61 (V2), the CPU 21 reads-out a first cut-out image among cut-out images recorded in the cut-out image memory 14A to supply it to the signal generator 16, which image is drawn in the VRAM 17. Since the through-image taken-in in the step V1 is already drawn in the VRAM 17, as the result an image synthesized by combining the through-image with the reproduced cut-out image is drawn. This synthesized image is read-out by the signal generator 16 and outputted to the liquid crystal display 20 through the amplifier 19 after having been A/A-converted by the D/A converting circuit 18 so that it is displayed at a predetermined position (at the center in the present ea embodiment) of the liquid crystal display 20. In this way, e.g. a synthesized image as indicated in FIG. 13A is obtained. In FIG. 13A, 21 represents a through-image, while 22 indicates a cut-out image (V3) and 23 indicates a background image.

The user judges whether the displayed cut-out image 22 is a desired cut-out image or not, while observing the synthesized image 20, as indicated in FIG. 13A, displayed on the liquid crystal display 20. Now, in case where the displayed cut-out image 22 is not the desired cut-out image, the process returns to the step V2. The user continues to push the frame button 61, until a desired synthesized image with the cut-out image is displayed. In this way the CPU 21 reads-out a cut-out succeeding image recorded in the cut-out image memory 14A to display the synthesized image at the predetermined position of the liquid crystal display 20 in the step V3 in a similar manner to the above described case. In case where the synthesized image with the desired cut-out image is displayed, the process proceeds to V5 (V4).

Figure 13B:
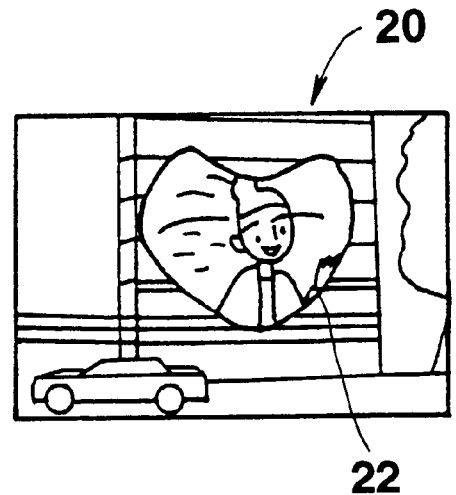

In case where the user judges that it is necessary to correct the position of the through-image 21 while observing the image displayed in the step V4 (e.g. in case where arrangement of the stuck image 22 is not preferable from the point of view of composition), the user moves the camera to regulate the angle so that the desired part of the through image 21 is superposed on the cut-out image 22 at the center of the screen (FIG. 13B). On the other hand, in case where it is not necessary to correct the position of the through-image 21 as shown in FIG. 13B, the user pushes the release button (V5).

In case where the desired synthesized image is obtained in the step V5, the user decides whether it should be recorded in the flash memory 14 or not (V6). In case where he decides as a result of this selection that the synthesized image should be recorded in the flash memory 14, when the user operates further the release button 63 (V7), the CPU 21 reads-out the synthesized image data drawn at that time in the VRAM 17 and has the flash memory store them as one of recorded images (V8). In the case where it is decided as the result of the selection in the step V6 that the synthesized image need not be recorded in the flash memory 14, the synthesized image is only displayed on the liquid crystal display 20.

Although, in the step V5 in FIG. 12A, the user has moved the camera to correct the position of the through-image 21 so that the desired part of the through-image is superposed on the stuck image 22, the step V5 may be so constructed that the user operates the cursor displacement keys 62 (or input means such as a pointing device, etc.) so as to be able to displace the cut-out image.

In this case, the apparatus can be so constructed that, in the case where it is necessary to correct the position of the cut-out image in the step V5 as indicated in FIG. 12B, when the user operates a displacement key corresponding to a predetermined direction among the displacement keys 62 (V5'), the CPU 21 moves the cut-out image in the direction corresponding to the operated displacement key 62 to be displayed and the process returns to V5 (V5"), and that, in the case where it is not necessary to correct the position of the cut-out image as the result of the selection in the step V5 (including cases where it is OK as the result of corrections in the steps V5' and V5") the process proceeds to V6.

Figure 13C:
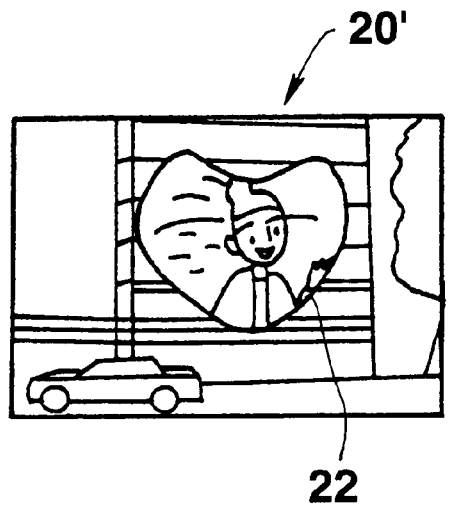
Figure 13D:
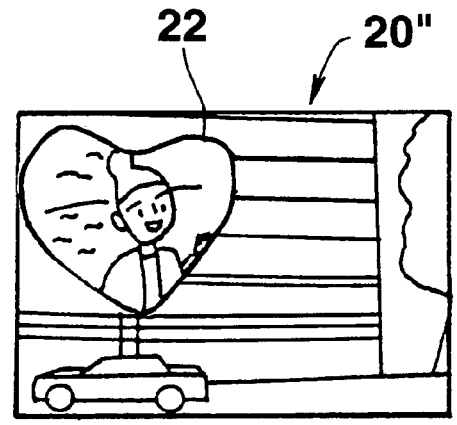

FIGS. 13C and 13D show examples, in which the cut-out image is displaced. Since the cut-out image 22 at the center is superposed on the background so that the background cannot be seen in FIG. 13A, the cut-out image 22 is displaced left-upward as indicated in FIG. 13B by operating displacement keys 62.

Further, although the present embodiment is so constructed that the synthesized image data are recorded in the flash memory 14 as one of recorded images as described in the step V8, it is not restricted thereon, but it can be so constructed that the link table 50 described previously is disposed in the flash memory 14 and at recording the synthesized image information is registered in the link table 50, attaching another meaning thereto than the recorded image. It may be so constructed also that, instead of recording the synthesized image, only such information is registered in the link table 50 and the synthesized image is reproduced on the basis of the information registered in the link table 50 at displaying the synthesized image or outputting it to an external device.

The cut-out image 22 used in FIGS. 13A to 13D is a synthesized image with a binary coded pattern and in this case the boundary of the cut-out image 22 is clear. On the contrary, when a cut-out image 22' based on a synthesized image with a luminance processed pattern as indicated in FIG. 14 is used, it is possible to obtain a synthesized image having a blurred boundary contacted with the cut-out image.

EMBODIMENT 4

Pattern Production/registration Processing
(Production/registration of a Mask Pattern Starting from a Recorded Image)

Although in Embodiment 1 described previously a desired mask pattern is extracted from a through-image to be registered, it is possible also to extract a mask pattern from a recorded image already registered.

The present embodiment is one of the pattern production/registration means 122, in which a desired part of a reproduced desired recorded image is extracted as a mask pattern under the recorded image synthesizing mode to be registered in the mask pattern memory 14B.

Figure 15:
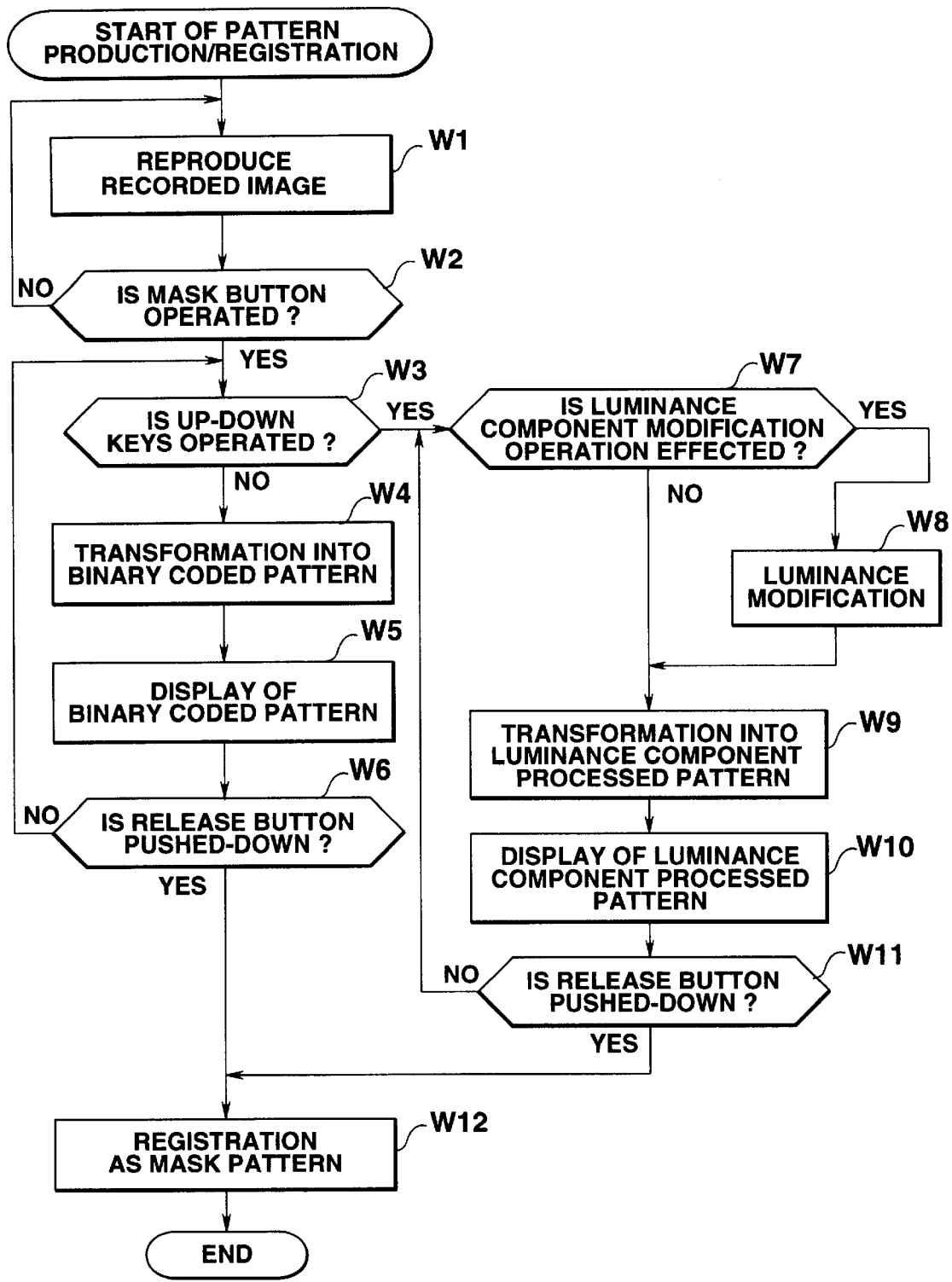
FIG. 15 is a flow chart showing an embodiment of a pattern production/registration processing operation.

FIG. 15 is a flow chart showing an embodiment of the pattern production/registration processing operation and FIGS. 16A to 16D are diagrams for explaining the pattern production/registration process on the basis of the flow chart indicated in FIG. 15.

In FIG. 15, the user operates the reproduction button 64 to set the reproduction mode and reproduces a first recorded image to display it.

Figure 16A:
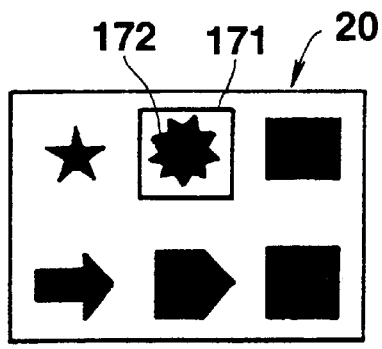
FIGS. 16A to 16D are diagrams for explaining a pattern production/registration process, based on the flow chart indicated in FIG. 15.
Figure 16B:
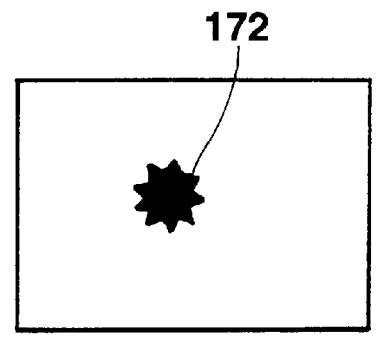
Figure 16C:
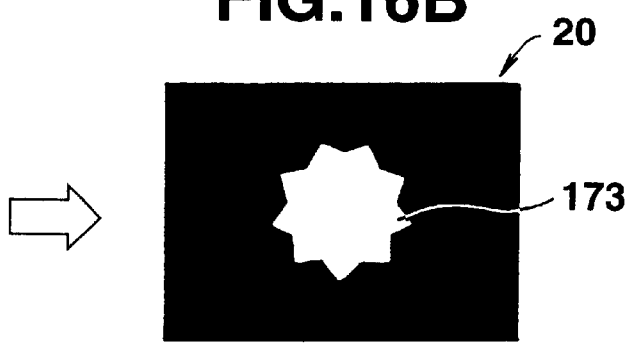

The user can reproduce an image including an object, from which he wants to make a mask pattern, to display it on the liquid crystal display 20. For example, a reproduced image (in this example an image of a picture, in which a pattern is drawn) as indicated in FIG. 16A is displayed on the liquid crystal display 20. Further, by a predetermined operation the CPU 21 displays a frame type cursor 171 at a predetermined position on the screen (W1).

Then, when the user positions the cursor 171 so as to enclose a desired image 172 therewith while observing the reproduced image and operates the mask button 66, the CPU 21 reads-out data corresponding to the part enclosed by the frame of the cursor 171 from the video data (compressed data) recorded in the flash memory 14 to supply them to the data compression/extension circuit 15. Then it writes the video data subjected to extending processing (FIG. 16B) in a work area of the DRAM 13 (W2). In case where a desired image is greater than the cursor 171 in the step W1, the user pushes the up-down key 67 (+) to enlarge the cursor 171 so that the desired image can be enclosed. On the contrary, in case where the desired image is too small with respect to the cursor 171, the user pushes the up-down key (−) to reduce the cursor 171 so that the size of the frame can be regulated.

Here the CPU 21 examines whether the user has operated the up-down keys 67 or not (W3). In case where the up-down keys 67 has been operated, the process proceeds to W7 and in case where it has not been operated, the object image (image data) written in the work area is cut-out and thereafter subjected to binary coding processing (W4).

After the binary coding processing, the signal generator 16 transforms these binary coded image data into video data to be drawn in the VRAM 17. Thereafter the video data drawn in the VRAM 17 are read-out and outputted to the liquid crystal display 20 to be displayed there. In this way a result obtained by processing the reproduced patterning candidate image into a binary coded pattern is displayed on the liquid crystal display 20. It is possible for the user to verify the pattern (FIG. 16C) by observing the image displayed on the liquid crystal display 20 (W5).

Here the CPU 21 examines whether the user has operated the release button 63 or not. In case where the release button 63 has been operated, the process proceeds to W12, while in case where it has not been operated, the process returns to W3 (W6).

In case where the up-down key 67 has been operated in the step W3, it is examined whether the luminance component modifying processing should be effected or not, and in case where it need not, the process proceeds to W9, while in case where it should be, the process proceeds to W8 (W7).

In case where the luminance component modifying processing is effected in the step W7, when the up-down key 67 (+) is pushed, the brightness is shifted by a predetermined value at a time (1 by 1 in the present embodiment) towards higher values, while when the up-down key 67 (−) is pushed, the brightness is shifted by a predetermined value at a time (1 by 1 in the present embodiment) towards lower values. Consequently the brightness can be varied by operating the up-down key 67 (+) or the up-down key 67 (−) (W8).

The luminance component of the patterning candidate image written in the work area in the DRAM 13 is taken-in in 8 bits and processed to be patternized (W9).

Every time the up-down keys 67 is operated once, the signal generator 16 transforms these luminance component processing image data into video data to be drawn in the VRAM 17. Thereafter the video data drawn in the VRAM 17 are read-out and outputted to the liquid crystal display 20 to be displayed there. In this way a result obtained by processing the desired patterning candidate image, which the user has read-out from the flash memory 14, is displayed on the liquid crystal display 20. It is possible for the user to verify the pattern (FIG. 16D) by observing the image displayed on the liquid crystal display 20 (W10).

Here the CPU 21 examines whether the user has operated the release button 63. In case where the release button 63 has been operated, the process proceeds to W12 and on the contrary, in case where it has not been operated, the process returns to W7 (W11).

In case where the release button 63 is pushed in the step W6 or W11, i.e. in case where the desired mask pattern (FIG. 16C or 16D) is obtained, the CPU 21 registers the displayed pattern image in the mask pattern memory 14B as a mask pattern (W12).

Figure 16D:
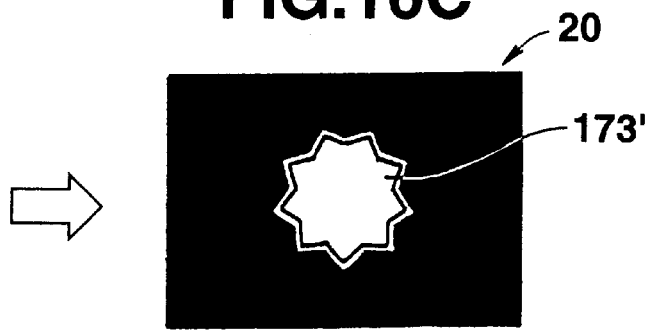

According to the present embodiment, the luminance component processed pattern image obtained in the step W10 is one having a feeling that neighborhoods of the boundary are blurred as indicated in FIG. 16D and therefore it is possible to obtain a cut-out image having a blurred feeling as indicated in FIGS. 14A and 14B (cut-out image). Further, according to the present embodiment, since it is possible to reproduce a recorded image and to extract/register it as a mask pattern, it is possible to take-out an image taken and recorded/conserved at a desired point of time and to fabricate a mask pattern in a simple operation.

Although, in the present embodiment, a frame type cursor 171 as indicated in FIG. 16A is displayed in the step W1 and the part enclosed by the cursor 171 in the reproduced image is extracted in the step W2, the present invention is not restricted thereto. Following examples can be cited as substituting embodiments;

(E) an example, where a point cursor is displayed in the step W1 and the user moves the point cursor by operating the displacement keys 62 so as to trace the contour of the desired part of the reproduced image to extract a closed domain, whose pattern is traced;

(F) an example, in which a transparent position detecting sensor is disposed on the screen; the contour of the desired part of a reproduced image is traced by means of a pointing device, etc. such as a tough pen, etc.; and a closed domain, whose pattern is traced, is extracted (Embodiment 8);

(G) an example, in which distance data of a plurality of objects included in an image are recorded together with image data; the image is reproduced; and certain parts of a reproduced image are specified by designating a distance to be extracted (Embodiment 9); and (H) further the pattern may be extracted by effecting the contour extracting processing by the fact that the user displaces the cursor on the screen by using the displacement keys to trace the contour of the object to be imaged.

EMBODIMENT 5

Recorded Image Synthesizing Processing
(Combining a Recorded Image and a Cut-out Image to Synthesize a New Image)

The present embodiment is an example of the recorded image synthesis by the recorded image synthesizing means 124, in which a recorded image recorded in the flash memory 14 is combined with a cut-out image with a frame registered previously in the cut-out image memory 14A to synthesize a new image under the recorded image synthesizing mode.

Figure 17:
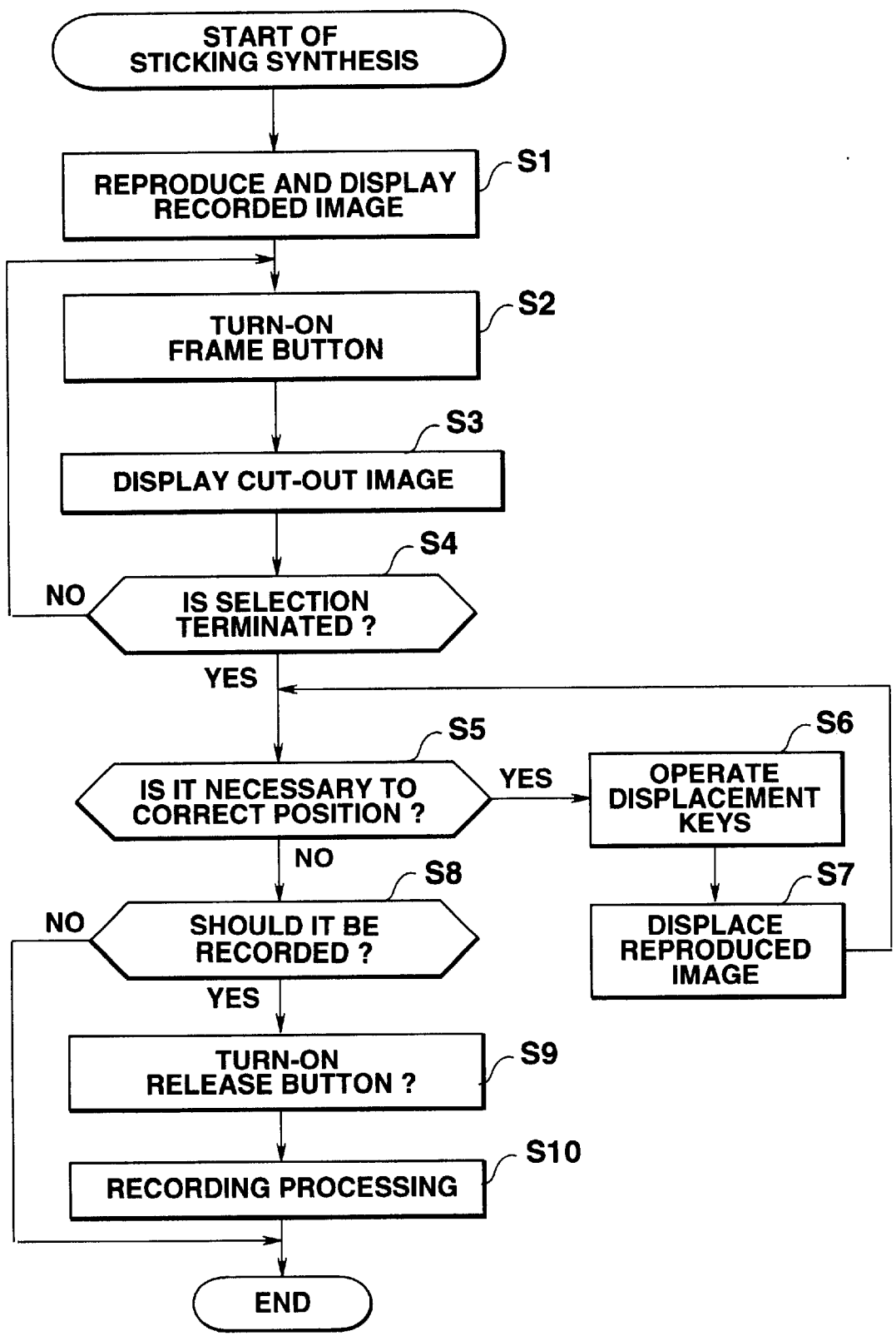
FIG. 17 is a flow chart showing an embodiment of an image sticking synthesizing processing operation of the digital camera indicated in FIG. 1.

FIG. 17 is a flow chart showing an embodiment of the recorded image synthesizing processing operation according to the present invention and FIGS. 8A to 8C are diagrams for explaining the synthesized image producing process on the basis of the flow chart indicated in FIG. 17.

Figure 18:
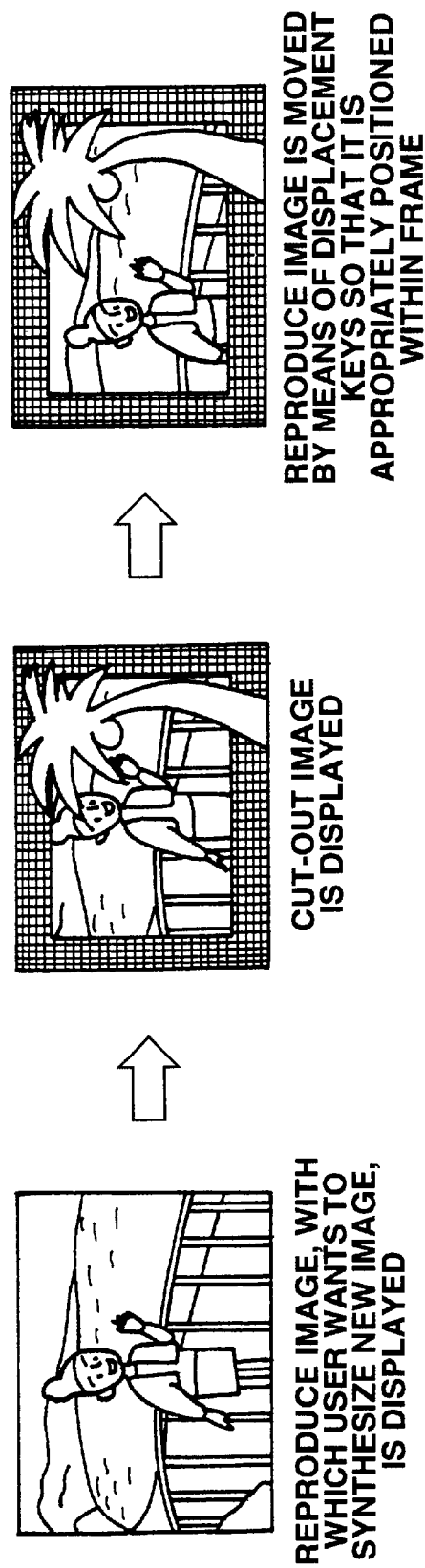
FIGS. 18A to 18C are diagrams for explaining a synthesized image producing process, based on the flow chart indicated in FIG. 17.

In FIG. 17, the user reads-out a recorded image used for a synthesis from the flash memory 14 and has the liquid crystal display 20 display it. This operation is effected by the fact that the reproduction mode is set by operating the reproduction button 64, that a first recorded image is reproduced to be displayed, and that a desired image is reproduced/displayed by operating the up-down keys 67 (reproduction/display mode). In this way, e.g. a reproduced image as indicated in FIG. 18A is displayed on the liquid crystal display (S1).

Then, when the user operates the frame button 61 (S2), the CPU 21 reads-out a predetermined cut-out image among cut-out images recorded in the image memory 14A to supply them to the signal generator 16, which is drawn in the VRAM 17. Since the recorded image reproduced in the step S1 is already drawn in the VRAM 17, as the result a synthesized image obtained by combining the reproduced image and the reproduced cut-out image is drawn in the VRAM 17. The synthesized image is read-out by the signal generator 16 and after having been D/A-converted by the D/a-converting circuit 18 it is outputted to the liquid crystal display 20 through the amplifier 19 to be displayed. In this way e.g. a synthesized image as indicated in FIG. 18B can be obtained (S3).

The user decides whether the displayed image is the desired cut-out image or not while observing the synthesized image displayed on the liquid crystal display 20. Now, in case where the displayed image is not the desired cut-out image, the process proceeds to the step S2 and the frame button 61 is operated again. In this way the CPU 21 reads-out a succeeding cut-out image recorded in the cut-out image memory 14A and displays the synthesized image on the liquid crystal display 20 in the step S3 in a similar way to the case described previously. The user continues to push the frame button 61, until the desired synthesized image with the cut-out image is displayed. When the desired synthesized image with the cut-out image is displayed, the process proceeds to S5 (S4).

The user decodes whether it is necessary to correct the position of the image within the frame or not while observing the synthesized image. As a result of this selection, in case where it is necessary to correct the position of the image within the frame, the process proceeds to S8 (S5).

In the step S5, in case where it is necessary to correct the position of the image within the frame, when the user operates the displacement key corresponding to a predetermined direction among the displacement keys 62 (S6), the CPU 21 displaces/displays the reproduced image to the direction corresponding to the operated displacement key and the process returns to S5 (S7).

For example, when in a state where the synthesized image indicated in FIG. 18B is displayed, leftward and downward displacements are instructed by operating the corresponding displacement keys 62, the image displayed, superposed on the cut-out image, is moved left- and downward as indicated in FIG. 18C. As described above, it is possible to move the background image (reproduced recorded image) within the frame so as to position it at a desired position.

In addition, it is possible also not to move the background image but to move the cut-out image.

In case where it is not necessary to correct the image within the frame as a result of the selection in the step S5

(including cases where it is OK as the result of the position correction (S6 and S7), the user decides whether the synthesized image displayed on the liquid crystal display 20 at that time should be recorded in the flash memory 14 or not (S8). As the result of this selection, in case where the synthesized image should be recorded in the flash memory 14, the process proceeds to S9 and in case where it need not, the process is terminated. In this case the synthesized image is only displayed on the liquid crystal display 20.

As the result of this selection, in case where the synthesized image should be recorded in the flash memory 14, when the user operates further the release button 63 (S9), the CPU 21 reads-out the synthesized image data drawn in the VRAM 17 at that time and has the flash memory 14 store them as one of recorded images (S10).

Although the present embodiment is so constructed that the synthesized image data are recorded as one of recorded images as described in the step S10, the present invention is not restricted thereto, it may be so constructed that the link table 50 (FIGS. 5A to 5C) is disposed in the flash memory 14 and that attaching another meaning thereto than the recorded image, such information is registered in the link table 50. Further it may be also so constructed that instead of recording the synthesized image only such information is registered in the link table 50 and that the synthesized image is reproduced on the basis of the information registered in the link table 50 at display of the synthesized image or output thereof at an external device.

EMBODIMENT 6

Cut-out Image Production/registration Processing (Production/registration of a Cut-out Image, Starting from a Recorded Image and a Mask Pattern)

Although the synthesizing processing described above is so constructed that a cut-out image with a frame previously recorded in the cut-out image memory 14A is read-out appropriately and a desired image is selected among a plurality of cut-out images, it is possible also to produce a cut-out image by using a recorded image stored already in the flash memory 14.

The present embodiment is one of the cut-out image production/registration processing by the cut-out image production/registration means 123, which combines appropriately a recorded image with a mask pattern previously registered to synthesize a new image and cuts-out an image to register it.

Figure 19:
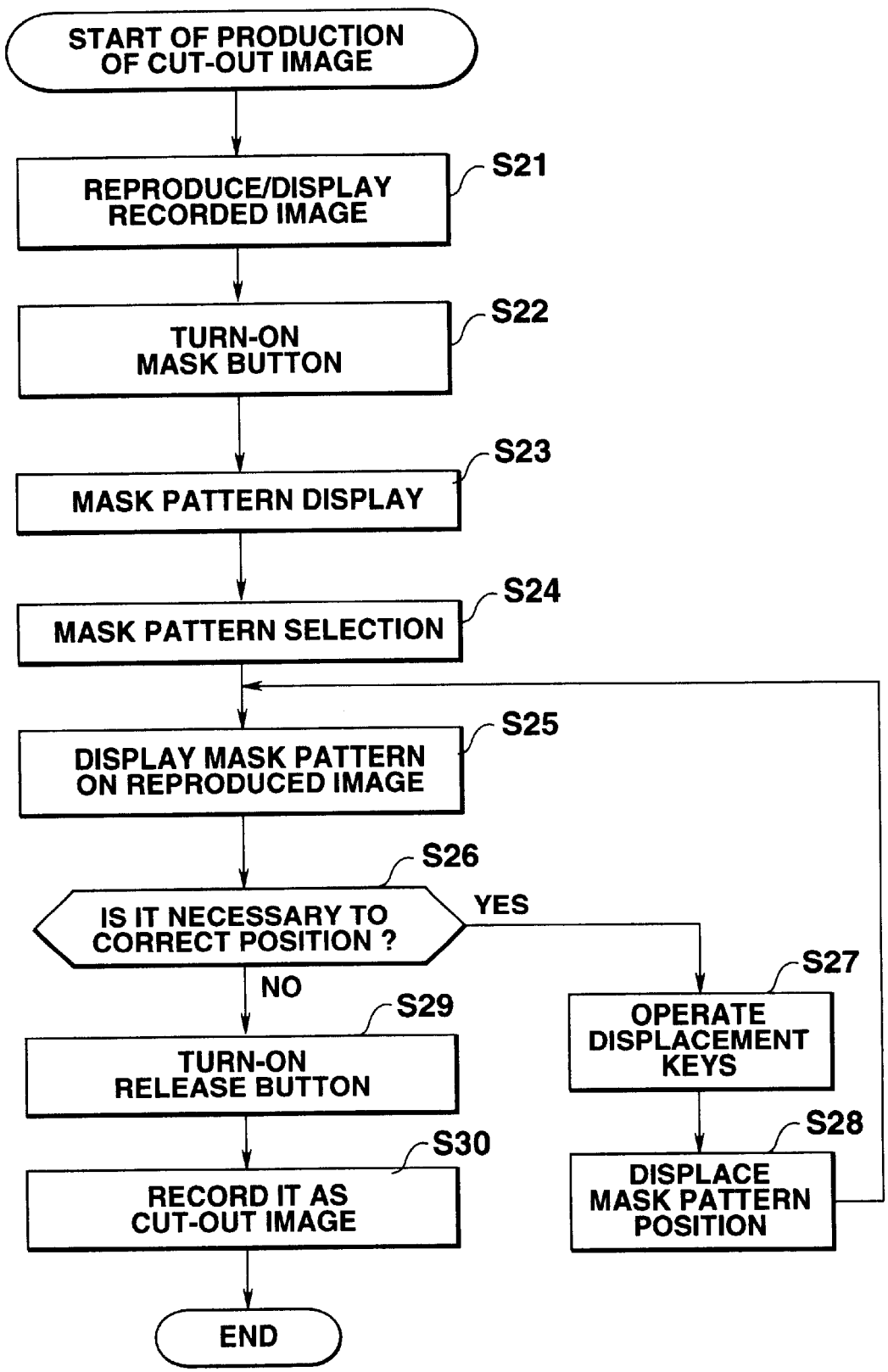
FIG. 19 is a flow chart showing an example of a cut-out image production/registration processing operation.

FIG. 19 is a flow chart showing an embodiment of the cut-out image production/registration processing operation and FIGS. 20A to 20E are diagrams for explaining the cut-out image production/registration process on the basis of the flow chart indicated in FIG. 19.

In FIG. 19, the user reproduces a first image to display it by operating the reproduction button 64 to set the reproduction mode and has the liquid crystal display 20 reproduce and display the image, from which the wants to make a cut-out image, by operating the up-down keys 67. In this way e.g. a recorded image as indicated in FIG. 20A is displayed on the liquid crystal display 20 (S21).

Then, when the user operates the mask button 66, the CPU 21 reads-out mask patterns stored in the mask pattern memory 14B; draws them in the VRAM 17 through the signal generator 16 (S22); and reads-out the mask patterns drawn in the VRAM 17, which are displayed on the liquid crystal display 20 through the D/A converting circuit 18 and the amplifier 19. In this way e.g. mask patterns as indicated in FIG. 20B are displayed on the liquid crystal display 20. At this time the CPU 21 displays also the cursor, superposed on the mask patterns (S23).

Here the user selects one of the mask patterns displayed on the liquid crystal display 20. That is, a cursor as indicated in FIG. 20B (a frame type cursor in the example indicated in the figure) is positioned on a desired mask pattern by operating displacement keys 62. In order to fix the selection, the mask button is operated again (S24).

The CPU 21 sends only the mask pattern selected in the step S24 to the VRAM 17, which is superposed on the reproduced image selected in the step S21 to be drawn. In this way e.g. the reproduced image indicated in FIG. 20A and the selected mask pattern indicated in FIG. 20B are superposed on each other to be displayed on the liquid crystal display 20 as indicated in FIG. 20C (S25).

Next, in case where the user judges that it is necessary to correct the position of the mask pattern while observing the displayed image, in which the two are superposed on each other in the step S25, the process proceeds to S27 and otherwise it proceeds to S29 (S26).

In case where the user judges that it is necessary to correct the position of the mask pattern in the step S26, he operates the displacement keys 62 (S27) to move the mask pattern. For example, if the upward key is operated among the displacement keys 62 in the state indicated in FIG. 20C, the mask pattern moves upward, as indicated in FIG. 20D (S28).

In case where the synthesized image is obtained by combining the desired mask pattern and the recorded image in the step S26 or S28, the user operates the release button 63 in order to register the synthesized image as a cut-out image in the flash memory (S29).

At this time the CPU 21 cuts-out the synthesized image (image indicated in FIG. 20D) displayed on the liquid crystal display 20 to record it as a cut-out image (pattern frame+ image) in the cut-out image memory 14A (S30).

When the cut-out image made by the user himself is registered in the cut-out image memory 14A in the manner as described above, it is possible to effect the cut-out image production processing by an operation similar to that explained, referring to the flow chart indicated in FIG. 17 (refer to Embodiment 5). That is, when the frame button 61 is operated a predetermined number of times in the step S2 in FIG. 17, the image indicated in FIG. 20D is read-out from the cut-out image memory 14A to be reproduced. Then it is reproduced on the liquid crystal display 20 in the step S3. Consequently, if the recorded image combined with the cut-out image to produce the synthesized image is previously reproduced and displayed, it is possible to synthesize an image by combining the cut-out image made by himself with another recorded image, as indicated in FIG. 20E. Further it is possible to record also the image synthesized in this way in the flash memory 14 by operating the release button as stated in S9.

As described above, in Embodiments 5 and 6, it is possible to synthesize a new image by combining an image recorded in the flash memory 14 with a cut-out image registered in the cut-out image memory 14A and further a cut-out image with a frame can be newly produced by combining appropriately an image and a mask pattern already recorded. In this way a recorded image can be easily processed (combined to synthesize).

EMBODIMENT 7

FIG. 21 is a flow chart showing an embodiment of the guiding frame display processing of the digital camera indicated in FIG. 1, in which imaging of a certificate photograph using a frame for certificate photograph is taken as an example, and FIGS. 22A to 22E are diagrams of the certificate photograph imaging processing on the basis of the flow chart indicated in FIG. 21.

Figures 22A, 22B, 22C, 22D, 22E:
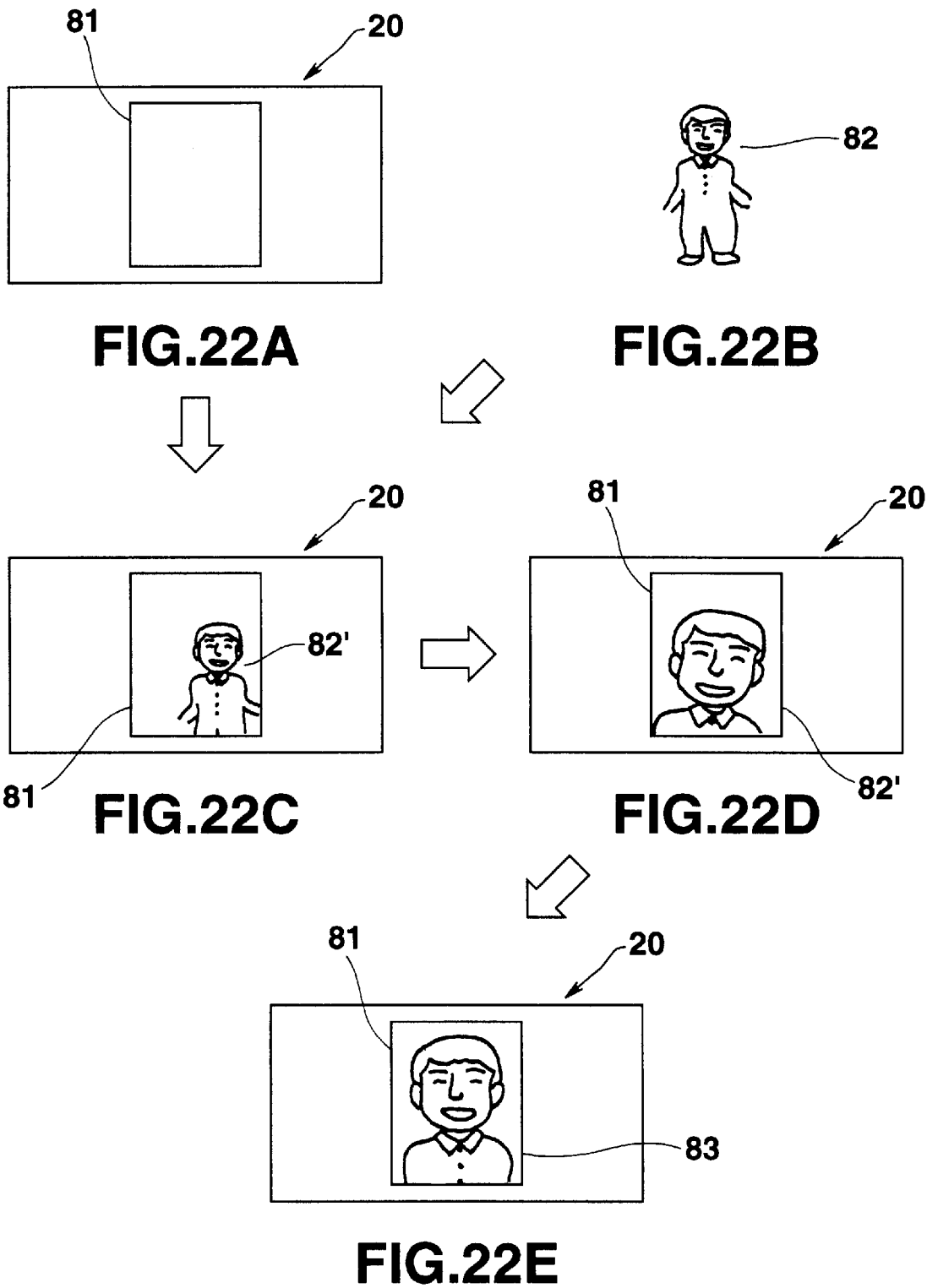
FIGS. 22A to 22E are diagrams for explaining a photographing for a certificate, based on the flow chart indicated in FIG. 21.

In FIG. 21, when the user operates the up-down key 67, the CPU 21 reads-out a mask pattern stored in the mask pattern memory 14B; draws it in the VRAM 17 through the signal generator 16; reads-out a guiding frame pattern drawn in the VRAM 17; and displays it on the liquid crystal display 20 through the D/A converting circuit 18 and the amplifier 19. In this way e.g. a guiding frame 81 as indicated in FIG. 22A (in this embodiment, a guiding frame for photograph for driver license) is displayed on the liquid crystal display 20. In this case, the guiding frame 81 is positioned at the center of the screen (X1).

Here, when the up-down keys 67 are operated further, a succeeding guiding frame is read-out to be displayed. The user judges whether the guiding frame displayed on the liquid crystal display 20 is desired one or not. In the case where it is not the desired guiding frame, the up-down keys 67 are operated, until the desired guiding frame appears, in order to display the guiding frame (X2).

In case where the desired frame is displayed in the step X2, the user examines whether a through-image 82' (FIGS. 22C and 22D) of an object to be imaged 82 (FIG. 22B) is positioned exactly within the guiding frame at the center of the screen (X3). In case where it is positioned exactly within the guiding frame, he pushes the release button 63 and otherwise the regulates the angle of the camera so that the desired through-image is positioned exactly within the guiding frame at the center of the screen (X4).

The CPU 21 examines whether the user has pushed the release button 63 (X5). In case where the release button has been pushed, the image 83 of the object displayed on the liquid crystal display 20 (FIG. 22E) is cut-out to be recorded in the flash memory 14 as a photographed image (X6).

It can be not cut-out at imaging, but a through-image is recorded as it is and it can be cut-out later from a reproduced image (that is, it can be used as a measure of imaging).

Further, although in the above explanation it is supposed that the guiding frame is one for photographic imaging, it may be either one of mask patterns and cut-out images. Moreover the mask patterns and the cut-out images may be those previously registered by a maker, etc. in a recording medium such as a flash memory.

In this way, since a guiding image can be displayed at imaging, it is possible to make the size of images almost even and therefore it is possible to take easily photographs for certificate, for which the size is prescribed.

EMBODIMENT 8

Example of Contour Extraction by Means of a Pointing Device or a Cursor

FIGS. 23A to 23D are diagrams for explaining an example of mask pattern production by contour extraction.

FIG. 23A is a reproduced recorded image, which corresponds to the reproduced image selected by the user in the step W1 in the flow chart indicated in FIG. 15.

FIG. 23B corresponds to the step W2 in the flow chart indicated in FIG. 15, which indicates a state where a desired image 91 (a bear in this example) is displayed and thereafter the contour of the face of the image 91 is traced by means of an input pen as 92. When designation of a domain to be extracted by means of the input pen is terminated and the user operates the release button 63, the CPU 21 obtains a closed region by using coordinates (xj, yj) of positions, through which the input pen has passed. Parts other than the closed region 93 on image data stored in a predetermined work area are offset (W3) and thereafter the remaining data are subjected to binary coding processing (W4).

FIG. 23C corresponds to the step W5 in the flow chart indicated in FIG. 15, in which a result obtained by processing the data into a binary coded pattern is displayed on the liquid crystal display 20. When the user operates the release button 63, supposing that a desired mask pattern (FIG. 23D) has been obtained, the pattern image 95 is registered in the mask pattern memory 14B as a mask pattern (W12).

Although, in the present embodiment, the reproduced recorded image has been traced by means of the input pen, it is possible also to obtain the mask pattern by an almost similar operation to the above described case, even if the contour of the face of the image 91 is traced by means of the cursor by operating the cursor displacement keys 62.

Further although, in the present embodiment, a contour of the reproduced image has been extracted by tracing it, also for a through-image, it is possible to obtain a desired mask pattern by effecting the contour extraction on the basis of the flow chart indicated in FIG. 7, similarly to the case of the recorded image.

EMBODIMENT 9

Example of Pattern Production Based on Distance Designation

When the user is looking to signboards, etc. on a street, there can be objects, which he wants to patternize.

The number of signboards in his field of view is not restricted to 1, but he can see a number of signboards from the foreground to the back in a narrow field of view. In such a case a number of signboards are in a same field of view of the camera, distant from each other.

The present embodiment is an example, in which objects, which are at different distances in a same field of view, are imaged in one recorded image as patterning candidates and reproducing the recorded image, each of the object can be subjected to a mask patterning operation.

In case where the digital camera has an autofocusing mechanism, the autofocusing mechanism works so that the focal point of the camera is decided so as to be adjusted to a point at which the user's eyes are turned (at the center of a finder in many cases). Denoting the distance between the object and the imaging lens 1 by a, the distance between the imaging lens 1 and the surface of the CCD 2 by b and the focal length of the lens by f, $1/a+1/b=1/f$ is valid.

Here, if the imaging lens 1 is displaced by $\pm \Delta x (\Delta x < b << a)$, $$1/(a-\Delta x)+1/(b+\Delta x)=1/f$$

or $1/(a+\Delta x)+1/(b-\Delta x)=1/f$ is obtained. Since $b<<a$, the first term of the left number, which $1/(a+\Delta x)$, can be regarded as $1/a$. Therefore $$1/a+1/(b\pm\Delta x)=1/f \qquad \text{(Equation 1)}$$

is valid.

Since displacement $\Delta X$ of the lens at the focused state owing to the autofocusing control is known, the distance a between the object and the imaging lens can be calculated by using Equation 1. Regulating slightly the camera so that objects, which are patterning candidates in a same field of view, are at the point at which the finder is turned one after another, distances between different patterning candidates and the lens can be obtained. Even if the digital camera has no auto-focusing mechanism, by using an imaging device provided with a distance measuring mechanism it is possible to obtain distances between different patterning candidates and the lens.

Figures 24A, 24B:
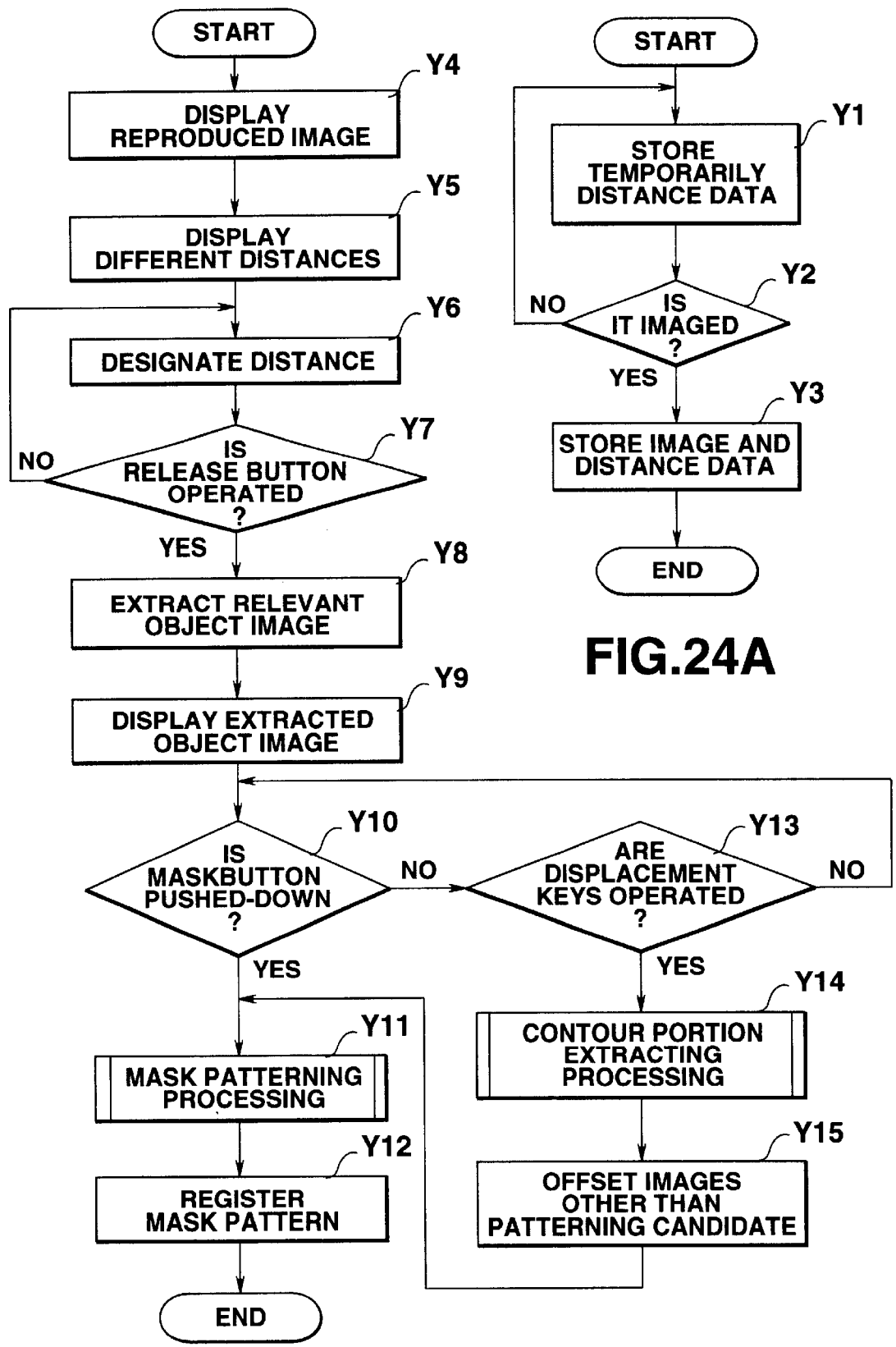
FIGS. 24A and 24B are flow charts showing an example of the pattern producing operation, based on a distance designation.

FIGS. 24A and 24B are flow charts showing examples of the pattern production operation on the basis of the distance designation, in which FIG. 24A indicates an operation of the distance data storing means 1126 at imaging, while FIG. 24B indicates a corresponding operation at reproduction (at patterning).

By the method described above distances aj (j=1~n) between different objects, which are patterning candidates in a same field of view, and the imaging lens 1 are obtained and stored temporarily in a distance data storing region in the DRAM 13 (Y1).

In case where the user effects an imaging by pushing the release button 63, the process proceeds to Y3 and other wise the process returns to Y1 (Y2).

In case where an imaging is effected in the step Y2, the different distance data of the image are read-out from the distance data storing region in the DRAM 13 at the same time as recording of the image data and stored in a distance column in the link table 50 (Y3).

At reproduction the distance data of the image are taken-out from the link table 50 at the same time as the desired reproduced image is displayed (Y4) to be displayed together with the reproduced image (Y5).

When the user operates the displacement keys 62 to designate either one of the displaced distances by means of the cursor (Y6) and pushes the release button 63 (Y7), the image of the object which is at this distance is extracted (Y8) to be displayed (Y9).

When the user pushes the mask button 66 (Y10), the displayed object image is subjected to the mask patterning processing such as the binary coding processing, contour extraction processing, etc. (T3~T11 in FIG. 7) (Y11) and registered as a mask pattern (Y12). In case where the displayed object images include, apart from the relevant patterning candidate, an image of another object at the same distance, the contour extracting processing described above (Embodiment 8) can be effected (Y14) by operating the displacement keys 62 (Y13).

In case where the contour extracting processing is effected, the images other than the pattern candidate are offset and the process proceeds to the patterning processing Y11 of the mask (Y15).

Further it is possible to obtain a plurality mask patterns from a same image by repeating such an operation. Moreover the apparatus may be so constructed that specifying a distance at displaying the through-image, an image of an object which is at that distance is extracted to be registered as a mask pattern.

In addition, it is possible also to designate a distance at displaying a through-image to extract an image to be imaged, which is at that distance, and to register it as a mask pattern.

EMBODIMENT 10

An Example of Input of an Image Drawn by Means of a Cursor or a Pointing Device

When the direct button 68 is pushed under the through-image synthesizing mode or the recorded image synthesizing mode, it is possible to input a trajectory (a figure obtained by connecting discontinuous designated points) drawn on the screen by means of a cursor or a pointing device as a pattern and to register it as a mask pattern after having subjected it to extracting processing.

Figure 25:
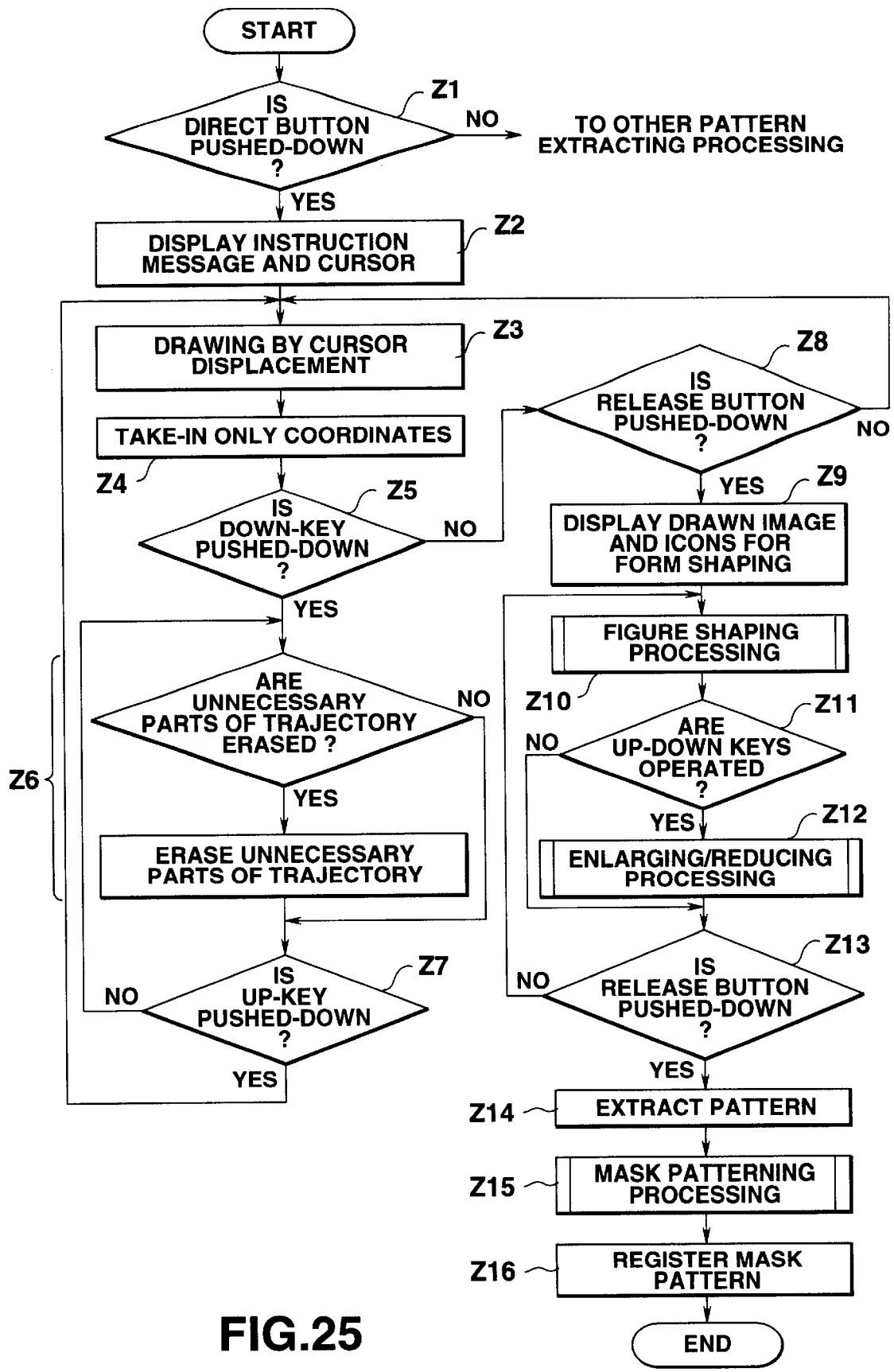
FIG. 25 is a flow chart showing an example of operation of the pattern producing means by a drawn pattern.

FIG. 25 is a flow chart showing an example of operation of the pattern production means 1125 and FIGS. 26A to 26G are diagrams for explaining formation of a mask pattern, starting from a pattern drawn by means of a cursor.

In case where the direct button 68 is pushed-down under the through-image synthesizing mode (Z1), the CPU 21 controls the timing generator 12 so that supply of image data to the signal generator 16 is interrupted and displays an instruction message to start input of a drawn image and the cursor 310 on the liquid crystal display 20, as indicated in FIG. 26A (Z2).

When the user operates the displacement keys 62 so as to move the cursor continuously, a trajectory 311, along which the cursor is displaced, is displayed (FIG. 26B) (Z3) and coordinates (xi, yj) on the trajectory are taken in a work area in the DRAM 13 one after another (Z4).

At this time, when the user pushes-down the down-key 67 (−) to move the cursor, the trajectory of the cursor is not displayed and coordinates of the trajectory are not taken in the work along the trajectory, superposed thereon, parts of the trajectory traced thereby can be erased (FIG. 26C) (Z6).

When the user pushes-down the up-key 67 (+), display of the trajectory of the cursor is started and taking-in of coordinates of the trajectory begins again (Z7).

When the release button 63 is pushed-down (Z8) after having formed a drawn figure, which is a closed region enclosed by a continuous line obtained by repeating the steps Z5 and Z6, an icon 301 for shaping a straight-line-like continuous line into a straight line, icons 302 and 303 for giving a curve-like continuous line smoothness, and icons for typical forms (e.g. a circle 304, an ellipse 305, a triangle 307, . . . , etc. are drawn and displayed together with the figure (FIG. 26E) (Z9).

When the user operates the displacement keys 62 and designates a desired icon after having designated a section PQ {(xa, yb), (xc, yd)} on the drawn figure 300 by means of the cursor (FIG. 26E), that section is shaped into the form of the designated icon (FIG. 26F). In case where the user wants to shape a part of the figure into typical one, when the user points an icon for a desired typical form after having pointed an inner region (a point within the closed region) of the drawn figure 300, the region is shaped into the typical form (Z10).

After the shaping has been terminated, when the user operates the up-down keys 67, enlargement/reduction of the figure is effected. A reduced pattern 300' is indicated in FIG. 26G (Z11, Z12). When the user pushes down the release button 63, the figure on the screen is extracted as a pattern (Z13, Z14).

When the pattern is extracted, it is subjected to the mask patterning procession (Z15) (refer to the steps T3~T11 in FIG. 7) and it is registered in the mask pattern memory 14B (Z16) after the mask patterning processing has been terminated.

EMBODIMENT 11

An Example of Display of a Preview Image (In Case Where the Boundary of the Mask Pattern is Blurred)

The present embodiment is an example, in which display of a preview image effected before a synthesizing processing is effected with a high speed, which display is e.g. a display of a registered mask pattern (U3 in FIG. 9, X1 in FIG. 21), a display of displacement of an image for cutting-out (the step V3 in FIG. 12A, the step S3 in FIG. 17, the step S21 in FIG. 19), a display of a background image (Ti in FIG. 7, U1 in FIG. 9, the step V1 in FIG. 12A, the step W1 in FIG. 15, the step Si in FIG. 17), etc.

For the image synthesis, there is disposed a memory region (work area) of 1 image (1 frame) in the DRAM 13. At the image display image data of one image to be displayed at that time are read-out from the memory (the mask pattern memory 14B for a mask pattern, the cut-out image memory 14A for a cut-out image, and the flash memory 14 for a recorded image) where they are stored and stored in the work area.

Here it is supposed that coordinates of the position of the left upper corner of the screen of the liquid crystal display 20 are (0, 0). At first, data corresponding to the coordinates (0, 0) on the screen are written at a position (0, 0) in the work area. Then data corresponding to the coordinates (xi, yj: i=0~n-1, j=0~m-1) on the screen are written at positions (xi, yj) in the work area one after another and finally data of 1 image are written-in.

Here the coordinates of the different data written in the work area are defined as follows for the sake of explanation.

coordinates of mask pattern data: M (xi, yj)

coordinates of cut-out image data: C (xi, yj)

coordinate of background image data: B (xi, yj)

display coordinates (coordinates of data in the work area after the synthesizing processing): W (xi, yj)

It is supposed also that the data are expressed in 8 bits.

In this case, e.g. in case where a mask pattern is displayed on an image, from which a cut-out image is formed, (a background image) for selecting the mask pattern, the mask pattern which is a selection candidate and the background image, which is the image, from which a cut-out image is formed, are subjected to a synthesizing processing. The coordinates of the display position of the mask pattern at this time are determined in a coordinate calculation for the image synthesizing processing as;

$$W(xi, yu)=m(xi, yj) \times B(x\ i, yj)+(255-M(xi, yj) \times C(xi, yj))/255$$

where the numerical value 255 is a brightness.

Further, in case where a cut-out image is produced by cutting-out a background image serving as an image, from which a cut-out image is formed, by means of a mask pattern, a cut-out candidate image is produced/displayed, synthesizing by combining the background image with the mask pattern while displacing the background image, when the user selects desired one among cut-out candidate images, he can cut-out (extract) it as a cut-out image. If a displacement amount is represented by 8 bits in the abscissa and q bits in the ordinate, the display coordinates in this case in the coordinate calculation for the image synthesizing processing area decided as follows:

$$W(xi, yj)=\{M(xi-p, yj-q) \times B(xi, yj)+(255-M(xi-p, yj-q) \times C(xi-p, yj-q)\}/255$$

Although, in the present embodiment, modules for display coordinate determination are incorporated in the pattern production means 1125 (or 1225) and the cut-out image production registration means 113 (123) for calculating the display coordinates, in order to increase the speed of coordinate calculations at a preview display for a high speed image display, the apparatus is so constructed that coordinate calculations are effected by classifying modules for display coordinate determination into several cases as stated below.

(I) The display coordinates of the mask pattern at selecting the mask pattern are calculated by using:

$$W(xi, yj)=C(xi, yj)$$

when the brightness of M (xi, yj) is lower than a certain threshold value, and $$W(xi, yj)=B(xi, yj)$$

when the brightness of M (xi, yj) is higher than the certain threshold value, and this processing is effected over the whole region (i=0~n-1, J=0~m-1) of the work area corresponding to 1 image. On the basis of this result, the mask pattern is displayed on the liquid crystal display 20 by using the cut-out image production/registration means 113 (123). In the present embodiment the threshold value is supposed to be 128.

According to the above coordinate calculation it is possible to display the mask pattern with a speed several times as high as a synthesizing speed at a usual image synthesizing processing (coordinate calculation speed). Further, although the boundary between the mask pattern and the background is clearer in this case, no problem is produced, even if the boundary is clear, because it is no synthesized display in practice, but it is a preview display.

(J) The display coordinates of the cut-out image at selecting the cut-out image are calculated by using;

$$W(xi, yj)=C(xi+p, yj+q)$$

when the brightness of M (xi, yj) is higher than the certain threshold value, and this processing is effected over the whole region (i=0~n-1, j=0~m-1) of the work area corresponding to 1 image. On the basis of this result, the cut-out image is displayed on the liquid crystal display 20 by using the through-image (recorded image) synthesizing means 114 (124). Here p and q represent displacement amounts (numbers of dots) in the abscissa and the ordinate, respectively. In the present embodiment the threshold value is supposed to be 128. According to the above coordinate calculation it is possible to display the cut-out image with a speed several times as high as a synthesizing speed at a usual image synthesizing processing (coordinate calculation speed).

(K) For the display coordinates of a background image (a through-image or a reproduced recorded image) at displaying a background image, real data are written as they are, i.e. coordinates of the through-image or the reproduced recorded image are written as they are in the work area. That is, $$W(xi, yj)B(xi, yj)$$

is valid and this processing is effected over the whole region (i=0~n-1, J-0~m-1) of the work area corresponding to 1 image. On the basis of this result, the background image is displayed on the liquid crystal display 20 by using the pattern production registration means 112 (122), the cut-out image production/registration means 113 (123), the through image synthesizing means 124 or the recorded image synthesizing means 124.

(L) At selecting a sticking position, denoting displacement amounts by p dots in the abscissa and q dots in the ordinate and a displacement amount of the sticking position from the center by r and s, respectively, the display coordinates of a cut-out image is calculate, supposing $$W(xi, yj)=C(xi+p-r, yj-q+s)$$

when the brightness of M (xi−r, yj−p) is lower than a certain threshold value, and $$W(xi, yj)=B(xi+p-r, yj-q+s)$$

when the brightness of M (xi−r, yj=p) is higher than the certain threshold value.

This processing is effected over the whole region (i=0~n−1, J=0~m−1) of the work area corresponding to 1 image. On the basis of this result, the cut-out image is positioned at the sticking position and displayed on the liquid crystal display 20 by using the thorough-image (recorded image) synthesizing means 114 (124). In the present embodiment the threshold value is supposed to be 128.

According to the above coordinate calculation it is possible to display the cut-out image with a speed several times as high as a synthesizing speed at a usual image synthesizing processing (coordinate calculation speed).

EMBODIMENT 12

An Example of Automatic Determination of Resolution of a Synthesized Image

Since the data capacity of an image is great, while the memory capacity is limited, in case where an image is stored in a memory, the image (data) is subjected to JPEG compression processing to be recorded and at reproduction a recorded image (data) is subjected to extension processing to be reproduced.

At the compression processing of an image, if resolution is increased, although the ratio of compression increases, processing duration increase. Therefore recording speed is lowered. On the contrary, if resolution is decreased, although the ratio of compression decreases, processing duration decreases. Therefore recording speed is raised.

A digital camera is usually so constructed that the user can select a resolution. Since resolution of the cut-out image or the background image of an image to be processed differs, depending on specification of that product, choice of resolution of the synthesized image is diversified.

In the present embodiment, in order to record rapidly the synthesizing image, it is supposed that resolution is adjusted to the lowest value and comparing an image recorded in the cut-out image memory 14A and an image recorded in a background image buffer (DRAM 13) in resolution by means of resolution automatically determining means, resolution of a synthesized image is determined to be the lower resolution. A synthesized image is compressed by the compression/extension circuit 15 on the basis of the resolution thus determined to be recorded in the flash memory 14.

Further the coordinate calculation at the synthesizing processing combining the cut-out image with the background image differs from that used for the display coordinate in the case of the preview display. That is, denoting displacement amounts by p dots in the abscissa and q dots in the ordinate and displacement amounts of the sticking position from the center by r and s, respectively, the coordinates at the synthesizing processing are calculated, supposing $$W(xi, yj)=M(xi-r, yj-s) \times B(xi, yj)+(255-M(xi-r, yj-s)) \times C(xi+p-r, yj+q-s))/255,$$

and the synthesis is executed by effecting this processing over the whole region (i=0~n−1, j=0~m−1) of the work area corresponding to 1 image.

As explained in the above, by the imaging method and the image processing method according to the present invention, the user can extract a mask pattern from a through image and an image recorded in a recording medium to register it in the recording medium and produce a cut-out image by using the through image and the image recorded in the recorded medium, which is cut-out and registered in the recording medium, in a simple manner. Further, since it is possible to produce a synthesized image by combining the cut-out image and a taken image or a recorded image to record it, a combined processed image can be simply obtained under a free conception of the user.

Moreover, since a guiding frame can be displayed at imaging, it is possible to make the size of images almost even or to image in a simple manner a photograph for certificate, etc., for which the size is prescribed.

Although various embodiments of the present invention have been explained in the above, the present invention is not restricted to the embodiment described above, but it is a matter of course that various modified realizations are possible.

What is claimed is:

1. An image pickup apparatus comprising:

image pickup means for picking up a first image and a second image of an object, and for outputting the picked-up first and second images;

image memory means for storing the picked-up first and second images output by said image pickup means;

image clipping pattern memory means for storing a plurality of different image clipping patterns, each having a different shape in accordance with each of which a part of the first image stored in said image memory means can be clipped out;

an image clipping pattern select means for selecting a desired one of said plurality of different image clipping patterns stored in said image clipping pattern memory means;

clipped image producing means for clipping out a part of the first image stored in said image memory means in accordance with the image clipping pattern selected by said image clipping pattern select means to produce a corresponding clipped image having a same shape as the selected image clipping pattern; and an image combining means for combining the second image stored in said image memory means with the clipped-out image produced by said clipped image producing means.

2. An image pickup apparatus comprising:

image pickup means for picking up an image of an object, and for outputting the image;

image memory means for storing the image outputted by said image pickup means;

image clipping pattern producing means for producing from the image outputted by said image pickup means an image clipping pattern having a predetermined shape;

image clipping pattern memory means for storing the image clipping pattern produced by said image clipping pattern producing means;

clipped image producing means for clipping out a corresponding part of and image different from the image used to produce the image clipping pattern, stored in said image memory means in accordance with the image clipping pattern stored in said image clipping pattern memory means to produce a clipped image having a same shape as said image clipping pattern;

appointing means for appointing a desired position in a desired image; and image combining means for combining the clipped image produced by said clipped image producing means with the desired image;

wherein the image combining means pastes the clipped image on the desired position in the desired image appointed by the appointing means.

3. An image pickup apparatus according to claim 2, wherein said image clipping pattern producing means produces the image clipping pattern by extracting an outline of a sub-image present in the first image.

4. An image pickup apparatus according to claim 2, further comprising specifying means for specifying an image pickup distance, and wherein said image clipping pattern producing means produces the image clipping pattern by extracting from the first image an image part corresponding to the image pickup distance specified by said specifying means.

5. An image pickup apparatus according to claim 2, wherein said image clipping pattern producing means produces the image clipping pattern by binary-coding the first image.

6. An image pickup apparatus according to claim 2, wherein said image clipping pattern producing means produces the image clipping pattern by operating on a luminance component of the first image.

7. An image pickup apparatus comprising:

image pickup means for picking up an image of an object, and for outputting the picked-up image;

image memory means for storing the image outputted by said image pickup means;

image drawing data input means for inputting image drawing data;

image clipping pattern producing means for producing an image clipping pattern having a predetermined shape to clip out a part of the image stored in the image memory means with a predetermined shape, based on the image drawing data inputted by said image drawing data input means;

image clipping pattern memory means for storing the image clipping pattern produced by said image clipping pattern producing means;

clipped image producing means for clipping out a corresponding part of the picked-up image stored in said image memory means in accordance with the image clipping pattern stored in said image clipping pattern memory means to produce a corresponding clipped-out image having a same shape as said image clipping pattern;

appointing means for appointing a desired position in a desired image; and image combining means for combining the clipped-out image produced by said clipping image producing means with the desired image;

wherein the image combining means pastes the clipped-out image on the desired position in the desired image appointed by the appointing means.

8. An image pickup apparatus according to claim 7, wherein said image drawing data inputting means includes at least one of a cursor and a pointing device for image drawing purposes.

9. An image pickup apparatus comprising:

image pickup means for picking up an image of an object, and for outputting a moving image including a still image;

display means for displaying the moving image outputted by said image pickup means;

image clipping pattern memory means for storing an image clipping pattern having a predetermined shape;

display control means for controlling said display means to display a composition of the moving image and the image clipping pattern stored in said image clipping pattern memory means;

an input device;

still image memory means for storing the still image outputted by said image pickup means;

clipped image producing means, responsive to said input device means being operated while the composition of the moving image and the image clipping pattern are being displayed on said display means, for clipping out a corresponding part of the still image displayed on said display means in accordance with the image clipping pattern displayed on said display means when said input device was operated so as to produce a clipped-out still image having a same shape as the image clipping pattern;

appointing means for appointing a desired position in a desired image; and image combining means for combining the clipped still image produced by said clipped image producing means with the desired image;

wherein the image combining means pastes the clipped still image on the desired position in the desired image appointed by the appointing means.

10. An image pickup apparatus according to claim 9, further comprising memory control means, responsive to said input device being operated while the composition of the moving image and the image clipping pattern are being displayed on said display device, for causing the clipped still image produced by said clipped image producing means to be stored in said still image memory, and wherein said image combining means combines the clipped still image and the picked-up still image stored in said still image memory means.

11. An image pickup apparatus comprising:

image pickup means for picking up an image of an object, and for outputting a moving image including a still image;

still image memory means for storing the still image outputted by said image pickup means;

display means for displaying the moving image outputted by said image pickup means;

image clipping pattern memory means for storing an image clipping pattern having a predetermined shape;

clipped image producing means for clipping out a corresponding part of the still image outputted by said pickup means in accordance with the image clipping pattern stored in said image clipping pattern memory means to produce a clipped-out image having a same shape as the image clipping pattern;

is display control means for controlling said display means to display a composition of the moving image and the clipped still image produced by said clipped image producing means;

an input device;

image combining means, responsive to said input device means being operated while the composition of the moving image and said clipped still image are being displayed on said display means, for combining the clipped still image displayed on said display means when said input device was operated with the picked-up still image displayed on said display means when said key input means was operated; and displacement appointing means for appointing a displacement of the clipped still image displayed on the moving image by the display control means to a desired position within a display plane;

wherein said display control means including means for pasting the clipped still image in the moving image on the desired position appointed by the displacement appointing means; and wherein said image combining means including means for pasting the clipped still image in the still image on the desired position appointed by the displacement appointing means.

12. An image pickup apparatus according to claim 11, further comprising memory control means for controlling said still image memory means to store the combined image produced by said image combining means.

13. An image pickup apparatus comprising:

image pickup means for picking up a first image and a second image of an object, and for outputting the picked-up images;

image memory means for storing the first and second images outputted by said image pickup means;

display means for displaying the first image stored in said image memory means;

image clipping pattern memory means for storing an image clipping pattern having a predetermined shape;

display control means for causing the image clipping pattern stored in said pattern memory means to be displayed on the first image displayed on said display means;

clipped image producing means for clipping out a corresponding part of the image displayed on said display means in accordance with the image clipping pattern displayed on said display means to produce a clipped image having a same shape as said image clipping pattern;

image combining means for combining the second image stored in said image memory means with said clipped image produced by said clipped image producing means; and displacement appointing means for appointing a displacement of the image clipping pattern displayed on the first image by the display control means to a desired position within the first image;

wherein said display control means causes the image clipping pattern to be displayed on the first image in the desired position appointed by the displacement appointing means; and wherein said clipped image producing means clips a corresponding part of the first image in accordance with the image clipping pattern displayed in the desired position on the first image by the display control means to produce a clipped image.

14. An image pickup apparatus comprising:

image pickup means for picking up a first image and a second image of an object, and for outputting the picked-up images;

image memory means for storing the first image outputted by said image pickup means;

display means for displaying the first image stored in said image memory means;

image clipping pattern memory means for storing an image clipping pattern having a predetermined shape;

clipped image producing means for clipping out a corresponding part of the second image outputted by said pickup means in accordance with the image clipping pattern stored in said image clipping pattern memory means to produce a clipped image having a same shape as said image clipping pattern;

display control means for causing the clipped image produced by said clipped image producing means to be displayed on the first image displayed on said display means;

memory control means for combining the clipped image produced by said clipped image producing means with the first image displayed on said display means, and for storing a resulting image in said image memory means; and displacement appointing means for appointing a displacement of the clipped image displayed on the first image by the display control means to a desired position within the first image;

wherein the display control means causes the clipped still image to be displayed on the first image in the desired position appointed by the displacement appointing means; and wherein the memory control means stores a composite image which comprises the clipped image pasted on the first image in the desired position appointed by the displacement appointing means.

15. A picked-up image processing method comprising:

selecting a desired one from among a plurality of different stored image clipping patterns, each having a different shape;

clipping out a part of a picked-up first image in accordance with the selected image clipping pattern to produce a corresponding clipped image having a same shape as the selected clipping pattern; and combining a picked-up second image with the produced clipped image to produce a target image.

16. A picked-up image processing method comprising:

picking-up an image of an object, and outputting the picked-up image;

storing the outputted image in an image memory;

producing an image clipping pattern having a predetermined shape;

storing the produced image clipping pattern in an image clipping pattern memory;

clipping a corresponding part of the image stored in the image memory in accordance with the image clipping pattern stored in the image clipping pattern memory;

appointing a desired position on a desired image; and combining the produced clipped image with the desired image by pasting the produced clipped image in the appointed desired position and outputting a resultant combined image.

17. A picked-up image processing method comprising:

picking up an image of an object, and outputting the picked-up image;

storing the outputted image in an image memory;

inputting image drawing data;

producing an image clipping pattern having a predetermined shape, based on the inputted image drawing data;

storing the produced image clipping pattern in an image clipping pattern memory; and clipping a corresponding part of the image stored in the image memory to produce a clipped image having a same shape as the image clipping pattern;

appointing a desired position on a desired image; and combining the produced clipped image with the desired image by pasting the produced clipped image in the appointed desired position to produce a combined image.

18. An image pick up apparatus comprising:

image pickup means for picking-up an image of an object, and for outputting the picked-up image;

image memory means for storing the image outputted by the image pickup means;

image clipping pattern storing means for storing an image clipping pattern having a predetermined shape;

clipped image producing means for clipping out a corresponding part of the image stored in the image memory means in accordance with the image clipping pattern stored in the image clipping pattern memory means to produce a clipped image having a same shape as the image clipping pattern;

appointing means for appointing a desired position on a desired image; and image combining means for combining the clipped image produced by the clipped image producing means with the desired image;

wherein the image combining means pastes the clipped image on the desired position in the desired image appointed by the appointing means.

19. An image pick up apparatus according to claim 18, wherein said appointing means includes means for appointing a desired position on the image stored in the image memory means, and the clipped image producing means clips the image in the desired position appointed by the appointing means in accordance with the image clipping pattern to produce a clipped image having a same shape as the image clipping pattern.

20. An image pickup apparatus comprising:

image pickup means for picking up an image of an object, and for outputting the picked-up image;

image memory means for storing the image outputted by the image pick up means;

image clipping pattern memory means for storing an image clipping pattern having a predetermined shape;

appointing means for appointing a desired position on the image stored in the image memory means;

clipped image producing means for clipping out an image in the desired position appointed by the appointing means in accordance with the image clipping pattern stored in the image clipping pattern memory means to produce a clipped image having a same shape as the image clipping pattern; and image combining means for combining the clipped image produced by the clipped image producing means with a desired image to produce a combined image.

21. An image pick-up apparatus according to claim 1, wherein:

the image pickup means further includes means for picking up a third image of the object and for outputting the picked-out third image;

said apparatus including an image clipping pattern producing means for producing from the third image outputted by said image pickup means an image clipping pattern having a predetermined shape to clip out a part of the first image stored in the image memory means; and the image clipping pattern memory means stores the image clipping pattern produced by the image clipping pattern producing means.

22. An image pickup apparatus according to claim 1, further comprising:

image drawing data input means for inputting image drawing data;

image clipping pattern producing means for producing an image clipping pattern having a predetermined shape to clip out a part of the first image stored in the image memory means, based on the image drawing data inputted by said image drawing data input means; and wherein the image clipping pattern memory means stores the image clipping pattern produced by the image clipping pattern producing means.

23. An image pickup apparatus according to claim 1, further comprising:

appointing means for appointing a desired position on the second image stored in the image memory means; and wherein the image combining means combines the clipped image produced by the clipped image producing means with the second image and pastes the clipped image on the desired position in the second image appointed by the appointing means.

24. An image pickup apparatus according to claim 1, further comprising:

appointing means for appointing a desired position on the first image stored in the image memory means; and wherein the clipped image producing means clips an image in the desired position on the first image appointed by the appointing means in accordance with the image clipping pattern to produce a clipped image having the same shape as the selected image clipping pattern.

25. A picked-up image processing method comprising:

picking-up an image of an object and outputting the picked-up image;

storing the outputted image in an image memory;

clipping out a corresponding part of the image stored in the image memory in accordance with the image clipping pattern stored in an image clipping pattern memory to produce a clipped image having a same shape as the image clipping pattern;

appointing a desired position on a desired image; and combining the produced clipped image with the desired image by pasting the produced clipped image in the appointed desired position to produce a combined image.

26. A picked-up image processing method comprising:

picking-up an image of an object and outputting the picked-up image;

storing the outputted image in an image memory;

appointing a desired position on the image stored in the image memory;

clipping out an image in the desired position appointed by the appointing means in accordance with an image clipping pattern stored in an image clipping pattern memory to produce a clipped image having a same shape as the image clipping pattern; and combining the produced clipped image with a desired image to produce a combined image.

\* \* \* \* \*